(12) United States Patent
Lee et al.

(10) Patent No.: US 10,657,672 B2
(45) Date of Patent: May 19, 2020

(54) IMAGE PROCESSING DEVICE, IMAGE PROCESSING METHOD AND STORAGE MEDIUM

(71) Applicant: NEC Corporation, Tokyo (JP)

(72) Inventors: Kapik Lee, Tokyo (JP); Takashi Shibata, Tokyo (JP); Atsushi Sato, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 118 days.

(21) Appl. No.: 15/763,863

(22) PCT Filed: Sep. 30, 2015

(86) PCT No.: PCT/JP2015/004969
§ 371 (c)(1),
(2) Date: Mar. 28, 2018

(87) PCT Pub. No.: WO2017/056130
PCT Pub. Date: Apr. 6, 2017

(65) Prior Publication Data
US 2018/0286074 A1    Oct. 4, 2018

(51) Int. Cl.
*G06T 7/73*    (2017.01)
(52) U.S. Cl.
CPC ...... *G06T 7/74* (2017.01); *G06T 2207/10056* (2013.01)
(58) Field of Classification Search
CPC .................. G06T 7/74; G06T 2207/10056
See application file for complete search history.

(56) References Cited

U.S. PATENT DOCUMENTS

2001/0033683 A1* 10/2001 Tanaka .................... G06T 7/001
                                                          382/149
2016/0048963 A1*  2/2016 Piestun ................ G06K 9/6807
                                                          382/154

FOREIGN PATENT DOCUMENTS

| JP | 10221357 A | 8/1998 |
| JP | 2007-078510 A | 3/2007 |
| JP | 2010-117175 A | 5/2010 |
| JP | 2014532188 A | 12/2014 |
| WO | 2013059338 A1 | 4/2013 |

OTHER PUBLICATIONS

Shota, Moriguchi et al., "A Circuit Design and Its Evaluation for Correlation Calculation in Particle Tracking System," IEICE Technical Report, VLD2010-132, Mar. 2011, pp. 93-98.
Written Opinion of the International Searching Authority of PCT/JP2015/004969 dated Dec. 15, 2015.
(Continued)

*Primary Examiner* — Leon Flores
(74) *Attorney, Agent, or Firm* — Sughrue Mion, PLLC

(57) ABSTRACT

The provided is an image processing technology to avoid inaccuracy of inferring a position of an object due to wrong model assumption.
An image processing device according to an exemplary aspect of the present invention includes: a matching unit 106 that estimates similarity of input image to particle images including areas of particles at relative positions, true positions of the particles in the particle images being given; and a calculation unit 108 that calculates positions of particles in the input image based on the similarity and the true positions.

13 Claims, 25 Drawing Sheets

(56) References Cited

OTHER PUBLICATIONS

International Search Report of PCT/JP2015/004969 dated Dec. 15, 2015.
Communication dated May 28, 2019, from the Japanese Patent Office in counterpart application No. 2018-513390.

* cited by examiner

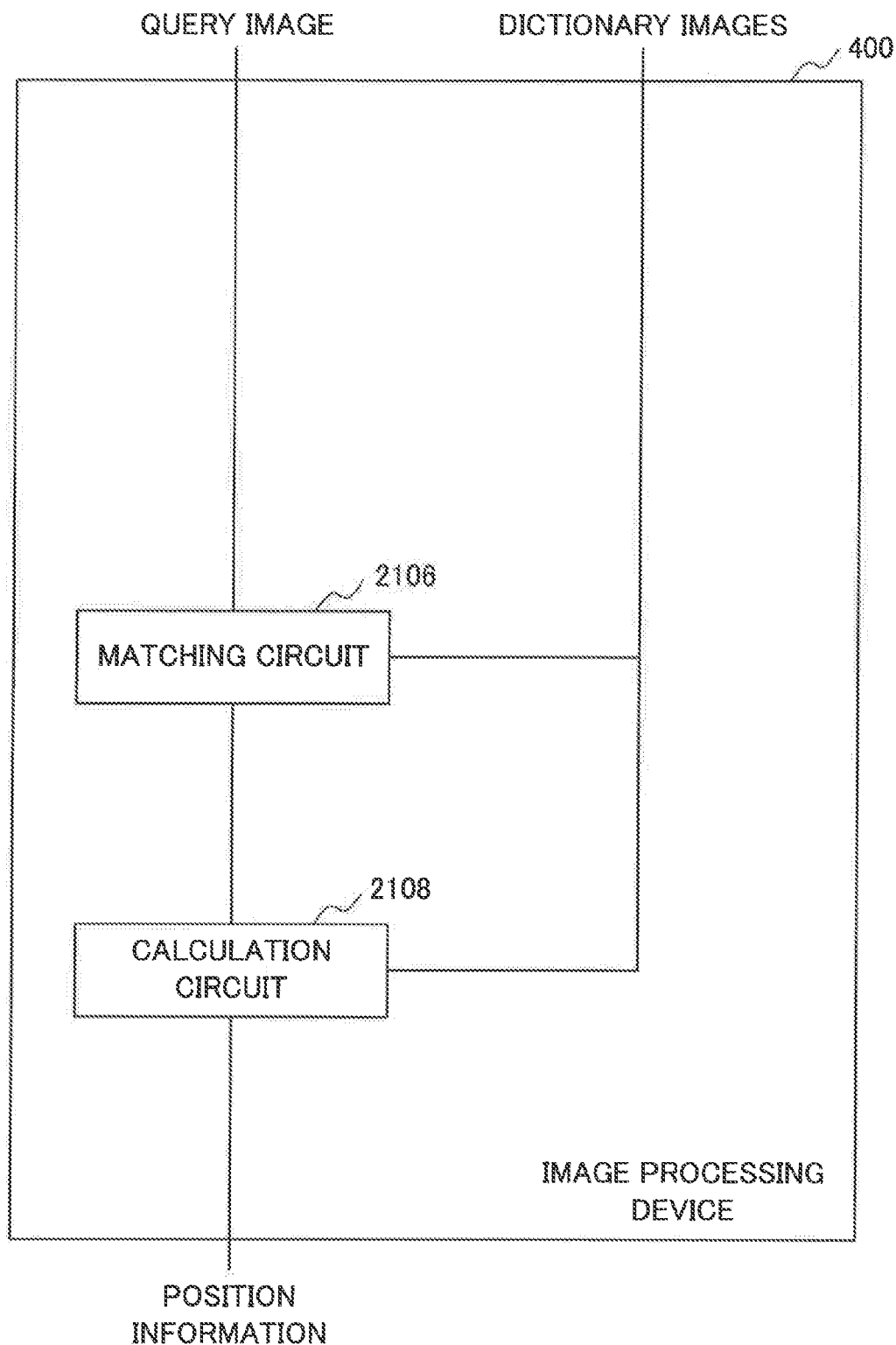

IMAGE PROCESSING DEVICE, IMAGE PROCESSING METHOD AND STORAGE MEDIUM

CROSS REFERENCE TO RELATED APPLICATIONS

This application is a National Stage of International Application No. PCT/JP2015/004969 filed Sep. 30, 2015.

TECHNICAL FIELD

The present invention is related to an image processing technology.

BACKGROUND ART

A model based method is often used for estimating a position of a target object in images with limited resolution in, for example, microscopic images or telescope images whose resolution is limited by optics such as diffraction limit. In model based method, the target object, such as a light emitting particle, is modeled as, for example, a spot in a certain shape in the image, at an assumed size and brightness. Then the optimization of the model over the observed light emitting particles is carried out to calculate a probability of the assumed model.

Patent Literature PTL 1 discloses a mark detection device which detects a mark by using models each having a small difference in shape among them.

CITATION LIST

Patent Literature

[PTL 1] Japanese Unexamined Patent Application Publication No. 2007-078510

SUMMARY OF INVENTION

Technical Problem

However, in a model based method of inferring a position of an object, the accuracy of the results strongly depends on the assumed model. The mark recognition device according to PTL 1 is not able to recognize an object accurately when the models are not appropriate.

An object of the present invention is to provide an image processing technology to avoid inaccuracy of inferring a position of an object due to wrong model assumption.

Solution to Problem

An image processing device includes: matching means for estimating similarity of input image to particle images including areas of particles at relative positions, true positions of the particles in the particle images being given; and calculation means for calculating positions of particles in the input image based on the similarity and the true positions.

An image processing method includes: estimating similarity of input image to particle images including areas of particles at relative positions, true positions of the particles in the particle images being given; and calculating positions of particles in the input image based on the similarity and the true positions.

A storage medium storing a program causes a computer to operate: a matching process of estimating similarity of input image to particle images including areas of particles at relative positions, true positions of the particles in the particle images being given; and a calculation process of calculating positions of particles in the input image based on the similarity and the true positions.

Advantageous Effects of Invention

According to the exemplary aspects of the present invention, the present invention is able to avoid inaccuracy of inferring a position of an object due to wrong model assumption.

BRIEF DESCRIPTION OF DRAWINGS

FIG. 25 is a block diagram of an example of a hardware structure of the image processing device according to the fourth exemplary embodiment of the present invention.

DESCRIPTION OF EMBODIMENTS

First Exemplary Embodiment

A first exemplary embodiment of the present invention will be explained in detail with reference to drawings.

Figure 1:
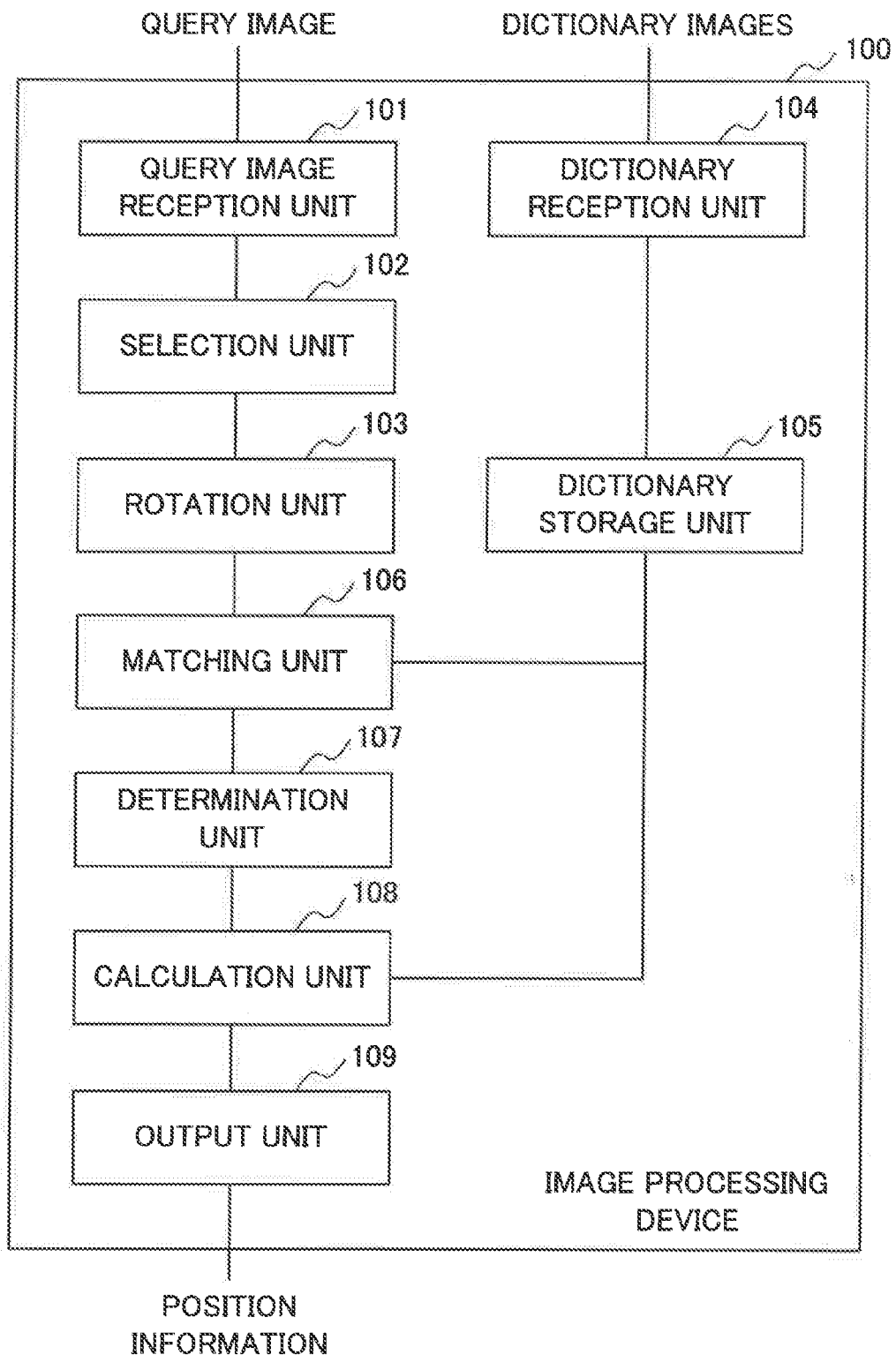
FIG. 1 is a block diagram showing an example of a structure of an image processing device according to a first exemplary embodiment of the present invention.

FIG. 1 is a block diagram showing an example of a structure of an image processing device 100 according to the first exemplary embodiment of the present invention.

The image processing device 100 includes a query image reception unit 101, a selection unit 102, a rotation unit 103, a dictionary reception unit 104, a dictionary storage unit 105, a matching unit 106, a determination unit 107 and a calculation unit 108.

The query image reception unit 101 receives an image including a connected area including pixels having similar intensities. The intensities of the connected area may be generally different from intensities of pixels not included in the connected area. The query image is referred to as a "query image" or an "input images" in the following description. The query image may be an astronomical image obtained by taking a picture of a cosmic space with a telescope and a camera. In this case, the connected area mentioned above may be image areas of stars. The query image is not limited to the above examples. The input image may be, for example, a microscopic image of particles (e.g. fluorescent particles), which are obtained by photographing the fluorescent particles with a microscope and a camera. In this case, the connected area mentioned above is an image area of the particle in the input image. The input image may be an extracted part of the microscopic image.

In the present exemplary embodiment and other exemplary embodiments of the present invention, a position (i.e. coordinates) of the image of each of the particles is not given and unknown on the input image. The position of a particle in the input image is, for example, a position (i.e. coordinates) of a point representing a center of the particle in the three dimensional space. Ideal sizes of the particles may be the same in the input image and dictionary images described below.

The query image reception unit 101 may receive the input image (i.e. query image) from, for example, the camera (not illustrated) taking the query image or a server apparatus (not illustrated) storing the query image taken by the camera.

The selection unit 102 selects (e.g. extracts) an area (hereinafter, referred to as "extracted area") including an image area or image areas of particles from the input image received by the query image reception unit 101. The selection unit 102 may extract, as the image area of a particle (hereinafter, referred to as "particle area"), a connected area in the input image based on intensities of pixels included in the connected area and a number of pixels included in the connected area.

More specifically, the selection unit 102 may extract particle candidate pixels that is candidates of pixels in an area of a particle by using an intensity threshold set to a value between typical intensity of the image areas of the particles (hereinafter, an area of a particle in an image is referred to as a "particle area") and typical intensity of a background area (i.e. area other than the particle areas). The typical intensity of the particle areas and the typical intensity of the background area may be derived experimentally. The candidates of pixels in particle areas are referred to as "particle candidate pixels" in the following description.

When the typical intensity of the particle area is larger than the intensity threshold, the selection unit 102 may extract, as the particle candidate pixels, pixels whose intensity is larger than or equal to the intensity threshold. When the typical intensity of the particle area is smaller than the intensity threshold, the selection unit 102 may extract, as the particle candidate pixels, pixels whose intensity is smaller than and equal to the intensity threshold.

The selection unit 102 may generate a connected area of the particle candidate pixels. The selection unit 102 may generate two or more connected areas of the particle candidate pixels.

The selection unit 102 may select a particle area from the generated connected areas on the basis of numbers of pixels included in the connected areas. The selection unit 102 may select, as a particle area, the connected areas including the particle pixels whose number is larger than a first size threshold. The selection unit 102 may select, as a particle area, the connected areas including the particle pixels whose number is larger than the first size threshold and not larger than a second size threshold larger than the first size threshold. The selection unit 102 may divide a connected area into a plurality of connected areas on the basis of a number of pixels included in the connected area.

The selection unit 102 may classify the particle area into one of two kinds of particle areas. For example, the selection unit 102 classify, as a particle area representing a particle (hereinafter, referred to as a "single-particle area"), the particle area including pixels whose number is larger than the first size threshold and not larger than a third size threshold. The third threshold is set to a number larger than the first size threshold and not larger than the second size threshold. The selection unit 102 may classify, as a particle area representing two particles (hereinafter, referred to as a "double-particle area"), the particle area including pixels whose number is larger than the third size threshold and not larger than a second size threshold.

When two or more of the connected areas are selected as the particle areas, the selection unit 102 may select two single-particle areas (i.e. two particle areas classified into a single-particle area) from the particle areas. The selection unit 102 may extract an area including the selected two single-particle areas. The selection unit 102 may repeat selecting the two single-particle areas and extracting the area including the selected two single-particle areas until all possible pairs of single-particle areas are selected. The selection unit may limit a distance between two single-particle areas to be selected to within a distance threshold.

When two or more of the connected areas are selected as particle areas, the selection unit 102 may further select a double-particle area (i.e. a particle area classified into a double-particle area) from the particle areas. The selection unit 102 may extract an area including the selected double-particle areas. The selection unit 102 may repeat selecting the double-particle area and extracting the area including the selected double-particle area until all the double-particle areas are selected.

The selection unit 102 may extract, as the above-described extracted area, a circumscribed rectangle of the selected single-particle areas or the selected double-particle area. The selection unit 102 may extract, as the extracted area, a rectangle including the circumscribed rectangle with a surrounding margin having a preset width. The extent of the extracted area is not limited to the above examples. In the following description, the selected single-particle areas or the selected double-particle area may be referred to as a "candidate area".

The selection unit 102 may remove, from the extracted area, a connected area other than the selected single-particle areas and the selected double-particle area by changing the intensities of pixels in the connected area other than the candidate area to a preset intensity of the background area. The preset intensity of the background area may be the above-described typical intensity of the background area.

An operator of the image processing device 100 may indicate an area including the particle area by using input device, such as a keyboard and/or a mouse (not illustrated) of the image processing device 100. The selection unit 102 may extract the area indicated by the operator.

The selection unit 102 may extract two or more extracted areas each corresponding to the above-described extracted area from the input image.

The rotation unit 103 estimates a line passing through the particle position of the input image. The rotation unit 103 may estimate the line on the extracted image extracted from the input image. The rotation unit 103 rotates the extracted image so that the direction of the estimated line on the extracted image match with (in other words, becomes or is the same as) a direction of a line passing through true particle positions of a dictionary image. The directory images including the dictionary image and the true particle positions are described below in detail. As described below, horizontal lines pass through the true particle positions of the directory images. The true particle positions are also referred to as true positions of particles.

For example, the rotation unit 103 rotates the extracted area extracted by the selection unit 102 so that the line passing through a center of gravity of the candidate area included in the extracted area and having the smallest moment of inertia concerning the candidate area in the extracted area becomes horizontal. The rotated extracted area is referred to as a "rotated area image" in the following description. In this case, the rotation unit 103 estimates, as the line passing through the particle position of the input image, the line passing through the center of mass gravity of the candidate area included in the extracted area and having the smallest moment of inertia concerning the candidate area in the selected extracted area.

More specifically, the rotation unit 103 extracts the center of gravity of the candidate area. The rotation unit 103 calculates the line passing through the center of gravity of the selected area and having the smallest moment of inertia for the selected area. The rotation unit 103 calculates an angle of the calculated line with a horizontal line. The rotation unit 103 calculates a transformation to rotate on a point (e.g. the center of gravity of the selected area) conversely by the calculated angle. The rotation unit 103 rotates the extracted area according to the calculated transformation to generate the rotation area image.

The rotation unit 103 may rotate the input image according to the calculated transformation. The rotation unit 103 may extract the rotation area image from the rotated input image including the candidate area in the same way as the way the selection unit 102 extracts the extracted area including the candidate area.

When rotating an image (original image), the rotation unit 103 may generate a rotated image from the original image by interpolation. More specifically, the rotation unit 103 may first calculate coordinates of each of the pixels of the original image after transformation of rotation rotating the calculated angle. The rotation unit 103 may calculate an intensity of each of the pixels of the rotated image by interpolation on the basis of the calculated coordinates and the intensity of the pixels of the image.

The dictionary reception unit 104 receives particle images (in the descriptions of the exemplary embodiments of the present invention, referred to as "dictionary images") with true particle positions. The particle images are images each including image areas of particles. The dictionary images are the particle images to each of which a true particle position is given. The true particle position given to a dictionary image represents a position of a particle in the dictionary image. The position of the particle in the dictionary image may be, for example, coordinates representing a point (e.g. a center) of a particle. The coordinates may be represented in a coordinate system fixed on the dictionary image.

The dictionary images may be, for example, images generated by simulations of particle activities or particle movements. In the present exemplary embodiment, it is assumed that a line connecting the two particles in each of the dictionary images is horizontal. In other words, each of the dictionary images of the present exemplary embodiment includes image areas of two particles. A horizontal line segment is able to connect points representing centers of the two particles. The dictionary images may be generated so that each of the dictionary images includes the two particles arranged in a horizontal line. Particle areas of the two particles may overlap to be a single particle area in the dictionary images. The two particles may have separated two particle areas.

The dictionary images vary in distance between two particles. In the dictionary images, the minimum difference among the distances between the two particles may be smaller than a size of a pixel of the dictionary images. Each of the dictionary images includes the particle area or the particle areas of the two particles and a background area surrounding the particle area or the particle areas.

Each of the dictionary images may be synthesized so that a distance between the particle positions of the two particles is selected from preset distances and the particle positions are the same when the distance between the particle positions are the same.

The dictionary reception unit 104 stores the received dictionary images with the true particle positions of the particles in the dictionary storage unit 105. The dictionary reception unit 104 may correlate, for each of the dictionary images which are received, the dictionary image with the true particle positions of the two particles in the dictionary image. The dictionary reception unit 104 may store, in the dictionary storage unit 105, the dictionary images each being correlated with the true particle positions of particles in the dictionary images.

The dictionary storage unit 105 stores the dictionary images and the true particle positions of the dictionary images received by the dictionary reception unit 104. The dictionary images may include perturbation of downsampling of the particle images such as noise and blur.

The matching unit 106 matches the rotated area image received from the rotation unit 103 with each of the dictionary images in the dictionary storage unit 105.

More specifically, the matching unit 106 selects a dictionary image from the dictionary images which are not selected. The matching unit 106 reads out the selected dictionary image from the dictionary storage unit 105.

Using the template matching, for example, the matching unit 106 searches for a relative position between the rotated area image and the selected dictionary image when the rotation area image and the selected image best match with each other on the basis of a matching score representing a degree of similarity between an area of the rotated image and an area of the selected dictionary image which overlap with each other.

The matching unit 106 may calculate the matching scores of overlapping areas of the rotated area image and the selected image over possible relative positions between the rotated area image and the selected dictionary image. The matching unit 106 may detect the best score among the matching scores calculated over the possible relative positions between the rotated area image and the selected dictionary image. The matching unit 106 may detect the relative relation between the rotated area image and the selected dictionary image when the best score is calculated from overlapping areas of the rotated area image and the selected image. The best score of the matching scores over a dictionary image in the dictionary images is referred to as a "closeness score".

When a size of each of the dictionary images is larger than the size of the rotated area image, the matching unit 106 may repeat selecting a dictionary image from the dictionary images, and sliding the rotated area image across the selected dictionary image to find a relative position at which the closeness score is calculated from the overlapping areas of the rotated area image and the selected dictionary image until all the dictionary images are selected. The relative position at which the closeness score is calculated is referred to as a "matching position".

The matching position may be represented by coordinates of a point, in the selected dictionary image, at a position corresponding to a position of a fixed point in the rotated area image when the rotated area image and the selected dictionary image overlap with each other at the matching position. The fixed point may be an origin of an image coordinate system defined in the rotated area image. The coordinates of the point in the selected dictionary image may be represented in an image coordinate system fixed in the selected dictionary image.

The determination unit 107 determines the best matched dictionary image by selecting a dictionary image having the best closeness score among the dictionary images. The determination unit 107 further determines the best relative position by selecting the matching position of the best matched dictionary image. The determination unit 107 may further extract the best matched area by extracting, from the best matched dictionary image, an area overlapping with the rotated area image when the best matched dictionary image and the rotated area image overlaps at the best matching relative position.

The calculation unit 108 calculates (i.e. estimates) positions of particles in the input image on the basis of the true particle positions of the best matched dictionary image, the best matching position, the transformation of rotation calculated by the rotation unit 103 and the position of the extracted area extracted by the selection unit 102.

In order to derive coordinates of the particles in the input image, the calculation unit 108 reads out the true position (i.e. coordinates) of the particles of the best matched dictionary image from the dictionary storage unit 105. The calculation unit 108 calculates coordinates of the particles in the rotated area image on the basis of the given coordinates (i.e. true positions) of the particles in the best matched dictionary image and the best matching position. The calculation unit 108 estimates the coordinates of the particles in the rotated area image by calculating coordinates, in the rotated area image, of points placed on the true particle positions of the best matched dictionary image when the rotated area image is overlapped with the best matched dictionary image at the best matching position.

The calculation unit 108 transforms the estimated coordinates in the rotated area image according to an inverse transformation of the transformation of rotation by the rotation unit 103 into coordinates of the particles in the extracted area extracted by the selection unit 102. The calculation unit 108 transforms the coordinates of the particles in the extracted area into coordinates (i.e. the particle positions) in the input image (i.e. query image) on the basis of the position of the extracted area in the input image.

The output unit 109 outputs position information indicating the calculated particle positions in the input image. The output unit 109 may draw marks each indicating a position of a particle at the calculated particle position on the input image, and may output the input image on which the marks are drawn. The output unit 109 may output test data representing the calculated particle positions.

Though the rotation unit 103 rotates the extracted area extracted from the input image in the above description, the rotation unit 103 may rotate the dictionary images or may rotate the image of the extracted area and the dictionary images so that an angle of a line passing through the points representing positions of the particle in the dictionary images to a line passing through a center of gravity and having the smallest moment of inertia in the extracted area becomes zero.

In the above description, a horizontal line passes through points at the true particle positions of each of the dictionary images. The line passes through points at the true particle positions of each of the dictionary image may not be horizontal. In this case, the rotation unit 103 may rotate the extracted image so that the direction of the estimated line on the input image becomes the same as the direction of the line passes through points at the true particle positions of the dictionary image with which the matching unit 106 matches the rotated area image.

Figure 17:
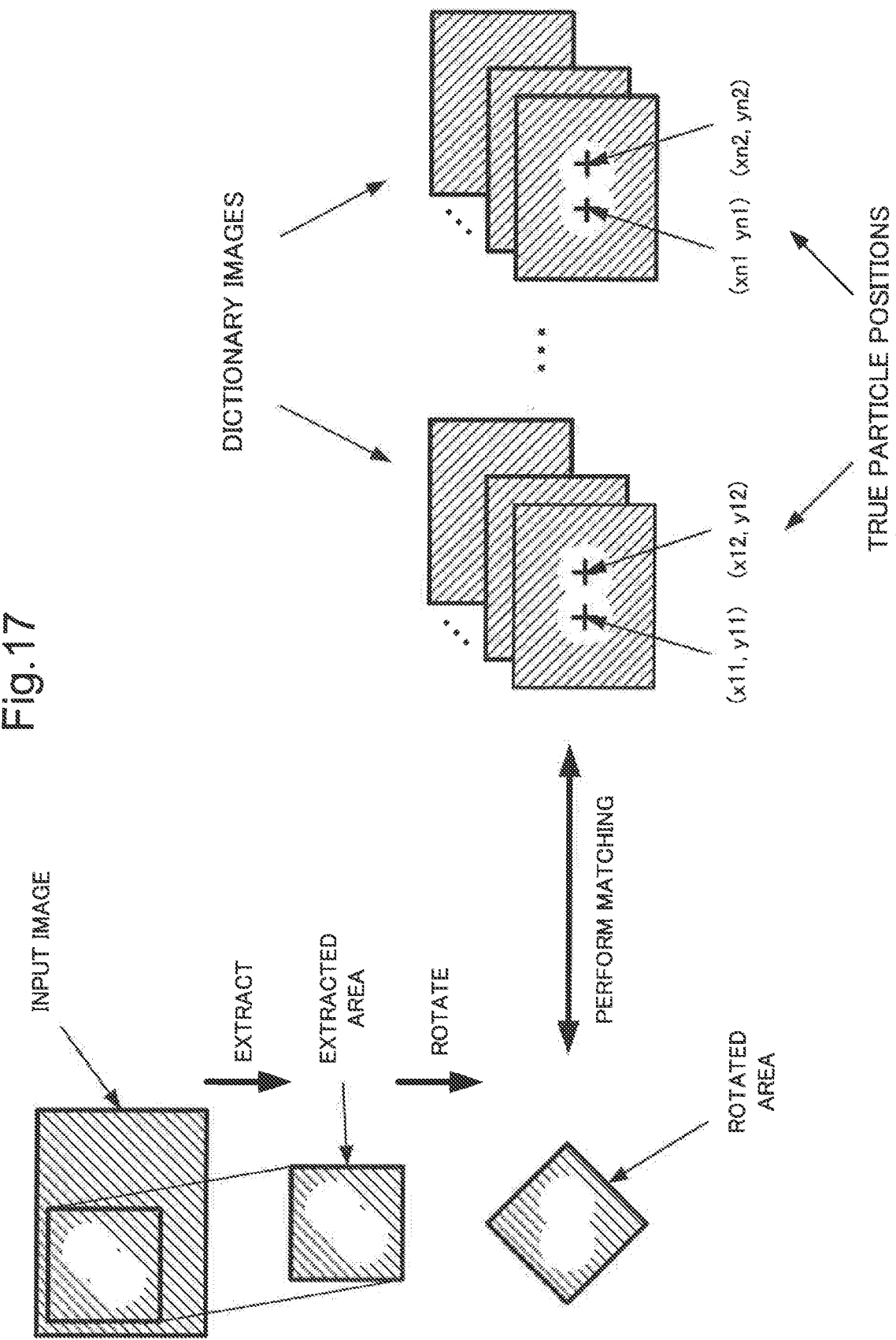
FIG. 17 is a schematic diagram showing the procedures of particle position estimation according to the first exemplary embodiment of the present invention.

FIG. 17 is a diagram schematically showing images related with procedures of particle position estimation according to the first exemplary embodiment of the present invention.

The query image reception unit 101 receives the input image. The selection unit 102 extracts the query image patch (i.e. the extracted area described above) from the received input image. The rotation unit 103 extracts a candidate area of particles from the query image patch. The rotation unit 103 rotates the query image patch so that the line passing through a center of gravity and having the smallest moment of inertia of the extracted candidate area in the extracted area becomes horizontal.

The dictionary storage unit 105 stores the particle images (i.e. the dictionary images described above) and the true particle positions. The particle images stored in the dictionary storage unit 105 includes perturbation of downsampling such as noise and blur. The matching unit 106 matches the rotated query image patch with each of the particle images in the dictionary storage unit. The matching unit 106 calculates, as a result of matching, matching score of the rotated query image patch with each of the particle images. The determination unit 107 determines the best matched dictionary image by selecting the best closeness score among all dictionary images. The calculation unit 108 estimates particle positions on the query image on the basis of the true particle positions of the best matched dictionary image.

Figure 2:
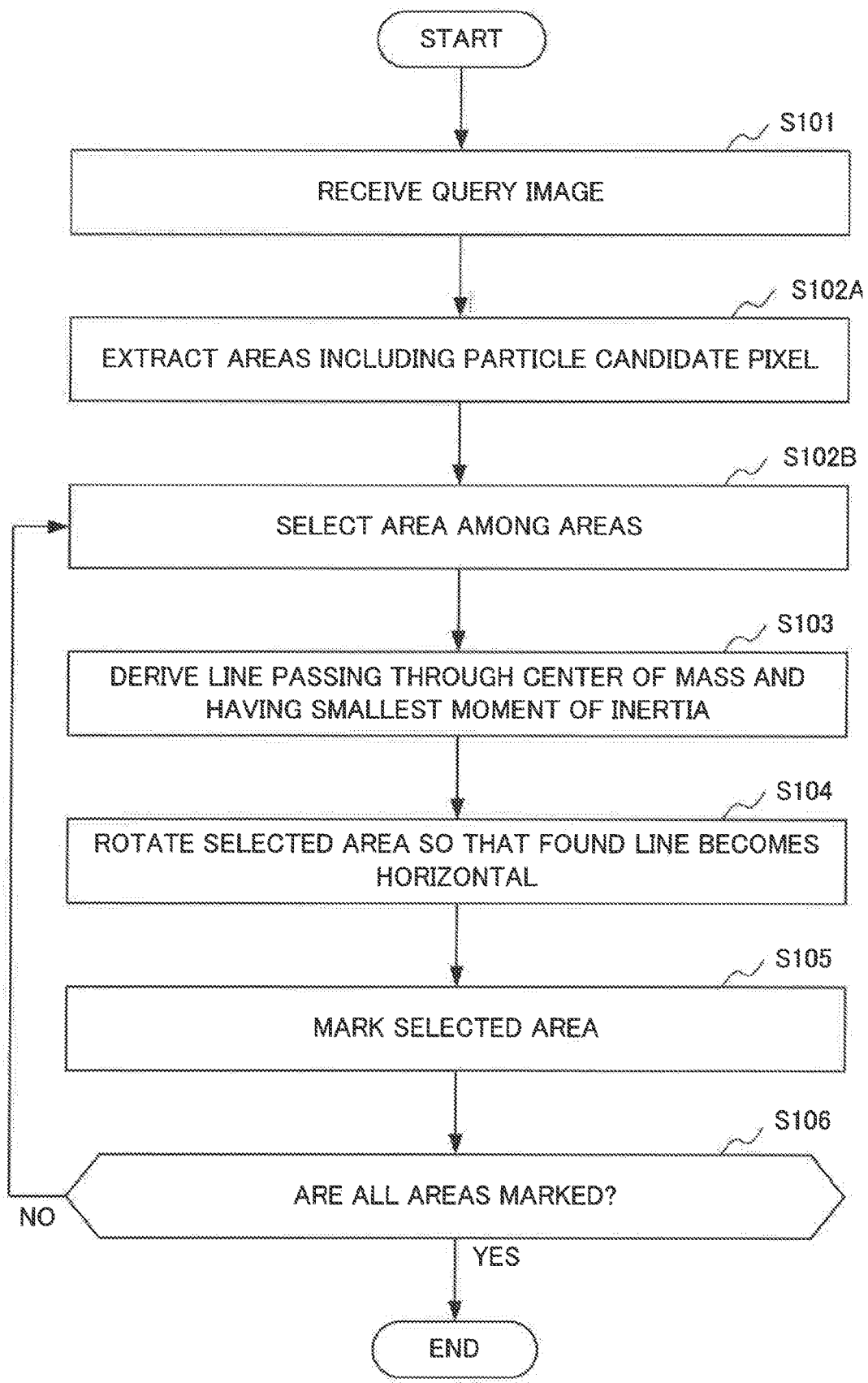
FIG. 2 is a flow chart showing an example of operation of the image processing device in a query generation phase according to the first, a second and a third exemplary embodiments of the present invention.

FIG. 2 is a flow chart showing an example of operation of the image processing device 100 in a query generation phase including receiving the query image, extracting an area from the query image, rotating the extracted area, and matching the image of the rotated extracted area and the dictionary images.

Figure 3:
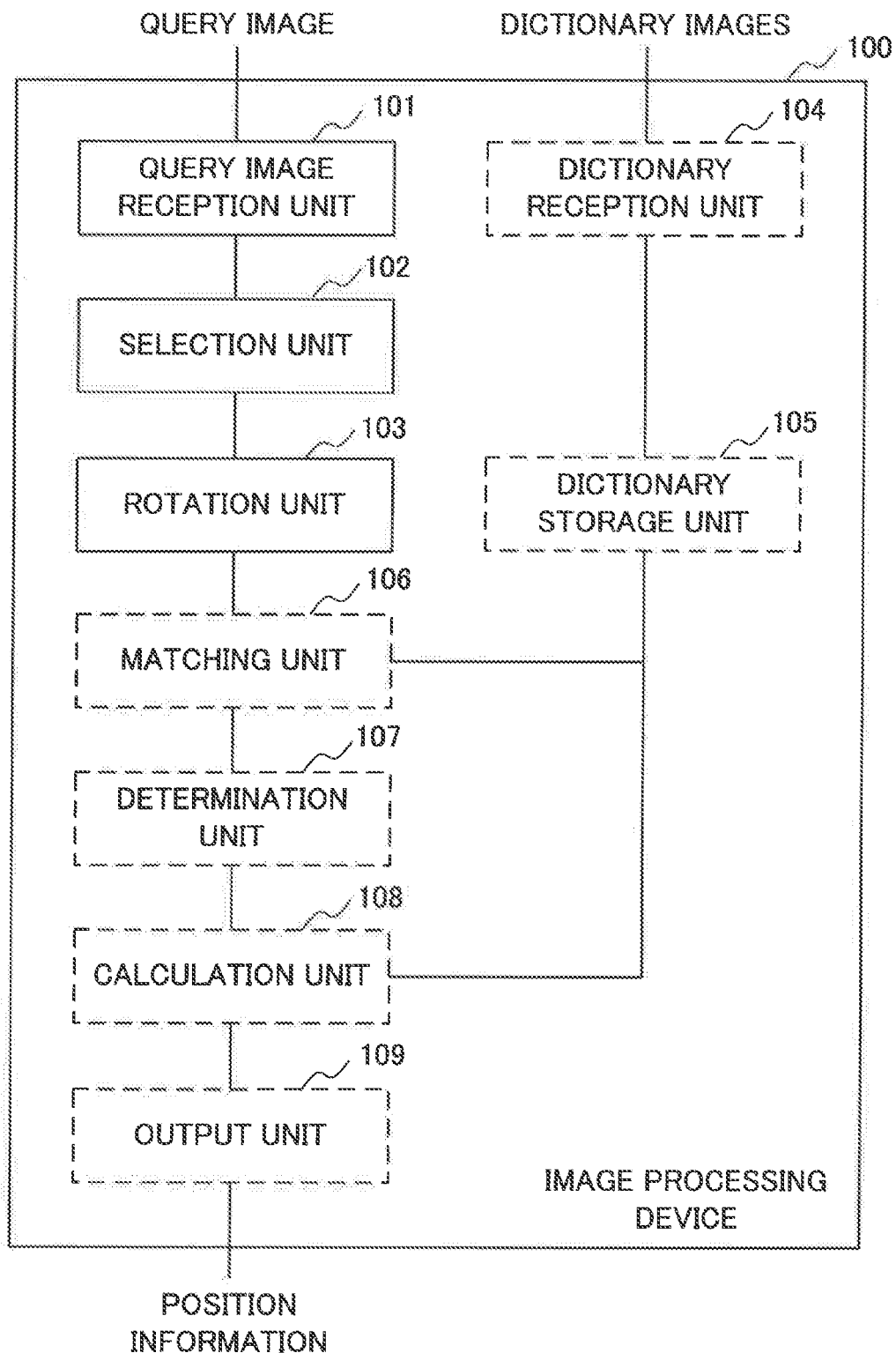
FIG. 3 is a block diagram showing an example of active units of the image processing device in the query generation phase according to the first, the second and the third exemplary embodiments of the present invention.

FIG. 3 is a block diagram showing an example of active units (i.e. units which operate) in the query generation phase of the image processing device 100. The active units in the query generation phase includes the query image reception unit 101, the selection unit 102 and the rotation unit 103. In FIG. 3, the active units are shown in solid lines, and other units are shown in broken lines.

According to FIG. 2, the query image reception unit 101 receives an input image that is a particle image (Step S101). The input image may be input by a microscope (not illustrated) capturing the input image. The input image may also be input by a telescope (not illustrated) capturing the input image. The input image may also be read out from a storage device (not illustrated) storing particle images.

Next, the selection unit 102 extracts an area or areas surrounding pixels (i.e. particle candidate pixels) with intensity greater than a defined threshold (Step S102A). The selection unit 102 selects an extracted area (i.e. selected area) among the extracted areas that are not selected (Step S102B).

Then the rotation unit 103 derives the line which passes through the center of mass (i.e. the center of gravity) of the particle candidate pixels so that the moment of inertia around this line is smallest (Step S103).

The rotation unit 103 rotates the selected area so that the derived line becomes horizontal (Step S104). The selection unit 102 marks the selected area as "selected" so that the same calculation is not performed twice or more (Step S105). When not all of the extracted areas are selected (NO in Step S106), the operation of the image processing device returns to Step S102B. When all the extracted areas are selected (YES in Step S106), the operation in FIG. 2 ends.

Figure 4:
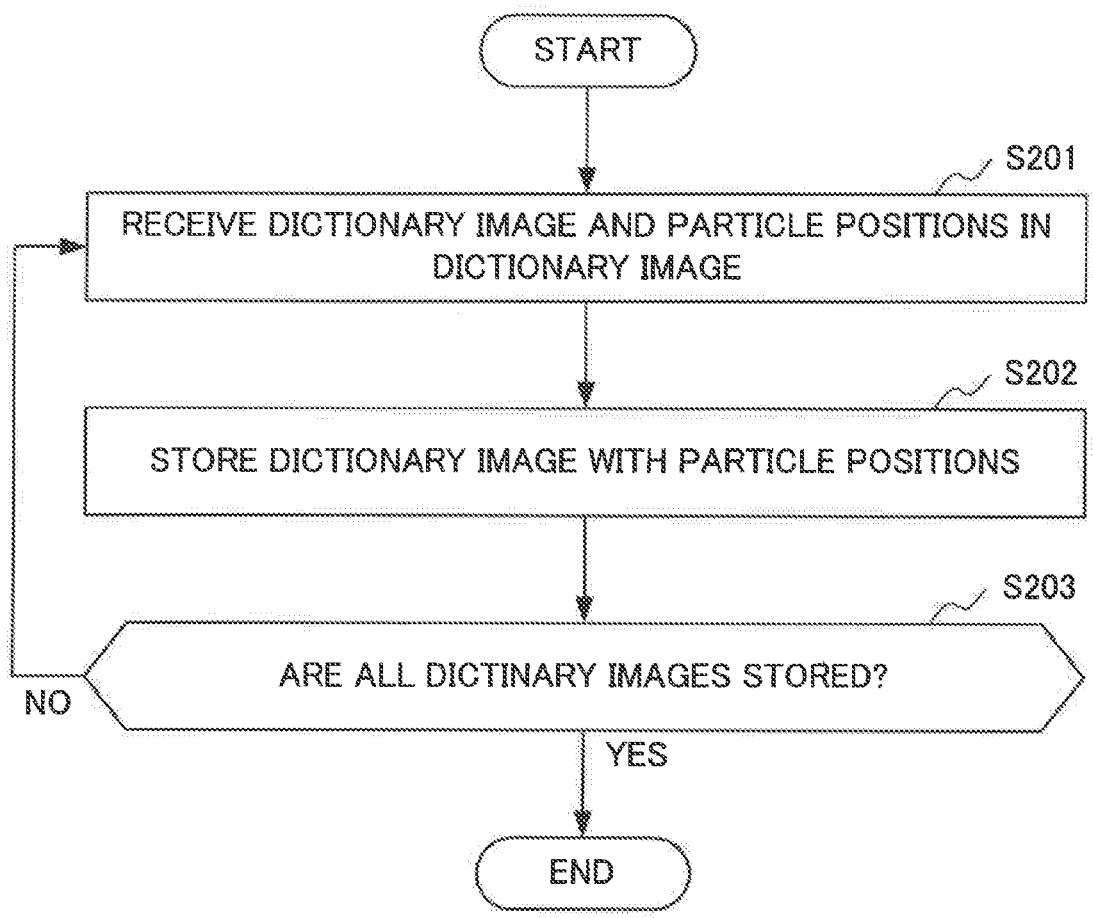
FIG. 4 is a flow chart showing an example of operation of the image processing device according to the first exemplary embodiment of the present invention.

FIG. 4 is a flow chart showing an example of operation of the image processing device 100 in a training phase.

Figure 5:
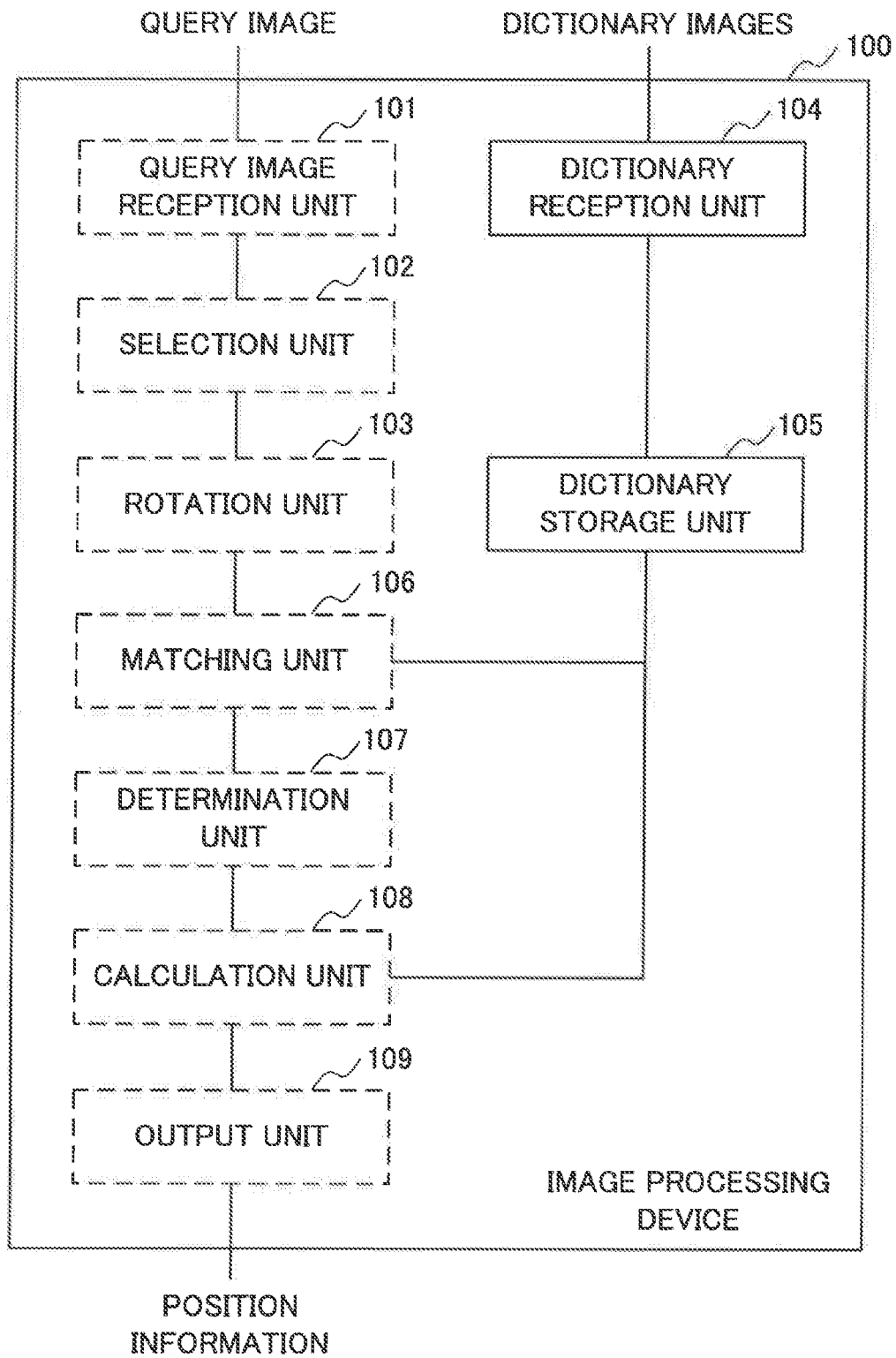
FIG. 5 is a block diagram showing an example of active units of the image processing device in the training phase according to the first exemplary embodiment of the present invention.

FIG. 5 is a block diagram showing an example of active units of the image processing device 100 in a training phase. The active units in the training phase are the dictionary reception unit 104 and the dictionary storage unit 105. In FIG. 5, the active units are shown in solid lines, and other units are drawn in broken lines.

According to FIG. 4, the dictionary reception unit 104 receives a particle image (i.e. dictionary image) with given particle positions (i.e. positions of particles) of the dictionary image (Step S201). Then the dictionary reception unit 104 stores the dictionary image with the particle positions in the dictionary storage unit 105 (Step S202). The dictionary image may be input by a microscope (not illustrated) capturing the dictionary image. The dictionary image may also be input by a telescope (not illustrated) capturing the image. The dictionary image may also be input by simulator generating simulation images of particles. The input dictionary image may also be read out from a storage device (not illustrated) storing the dictionary images. When not all the dictionary images are stored in the dictionary storage unit 105 (NO in Step S203), the operation of the image processing device returns to Step S201. When all the dictionary images are stored, the operation shown in FIG. 4 ends.

Figure 6:
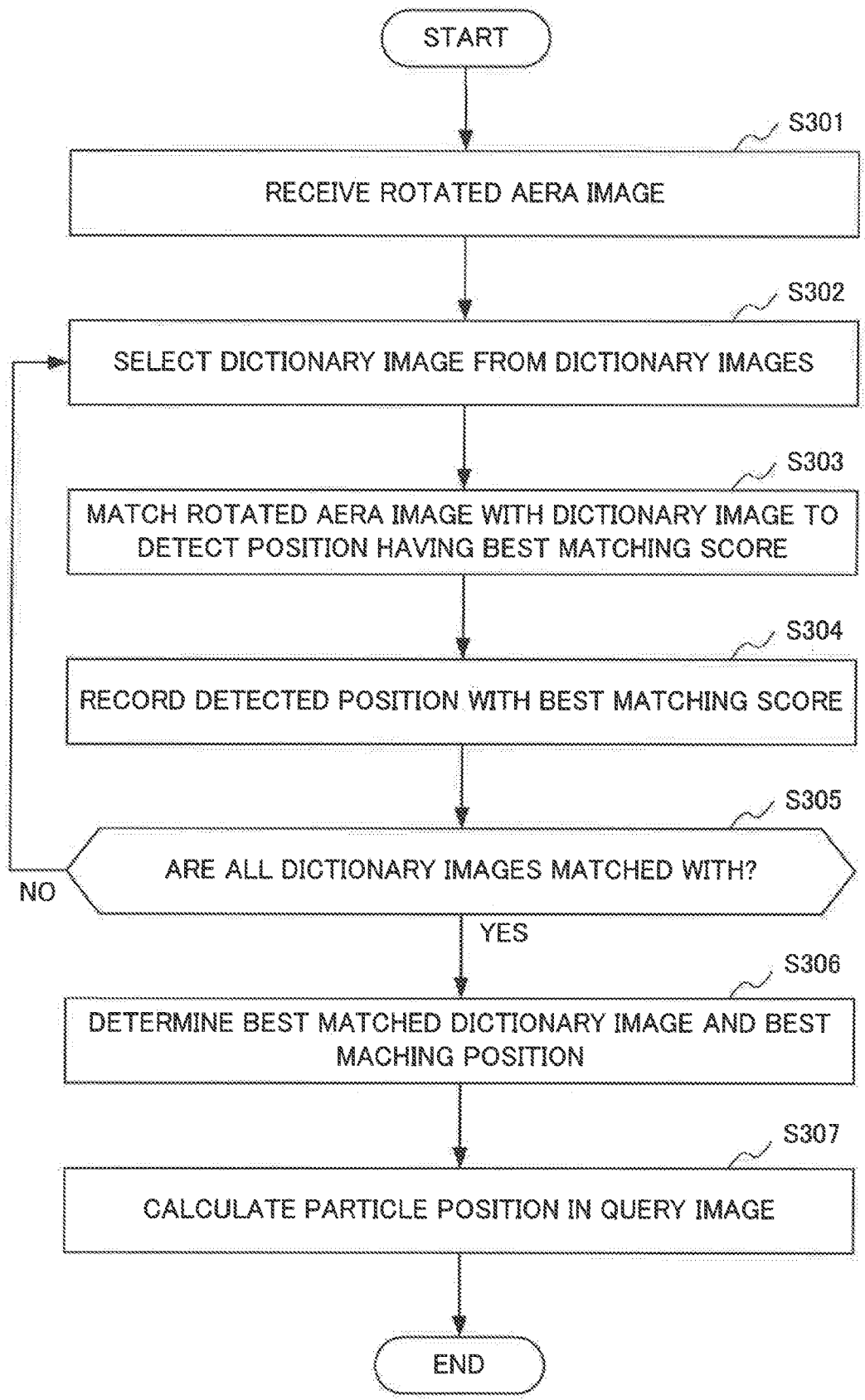
FIG. 6 is a flow chart showing an example of operation of the image processing device in a matching phase according to the first exemplary embodiment of the present invention.

FIG. 6 is a flow chart showing an example of operation of the image processing device 100 in a matching phase.

Figure 7:
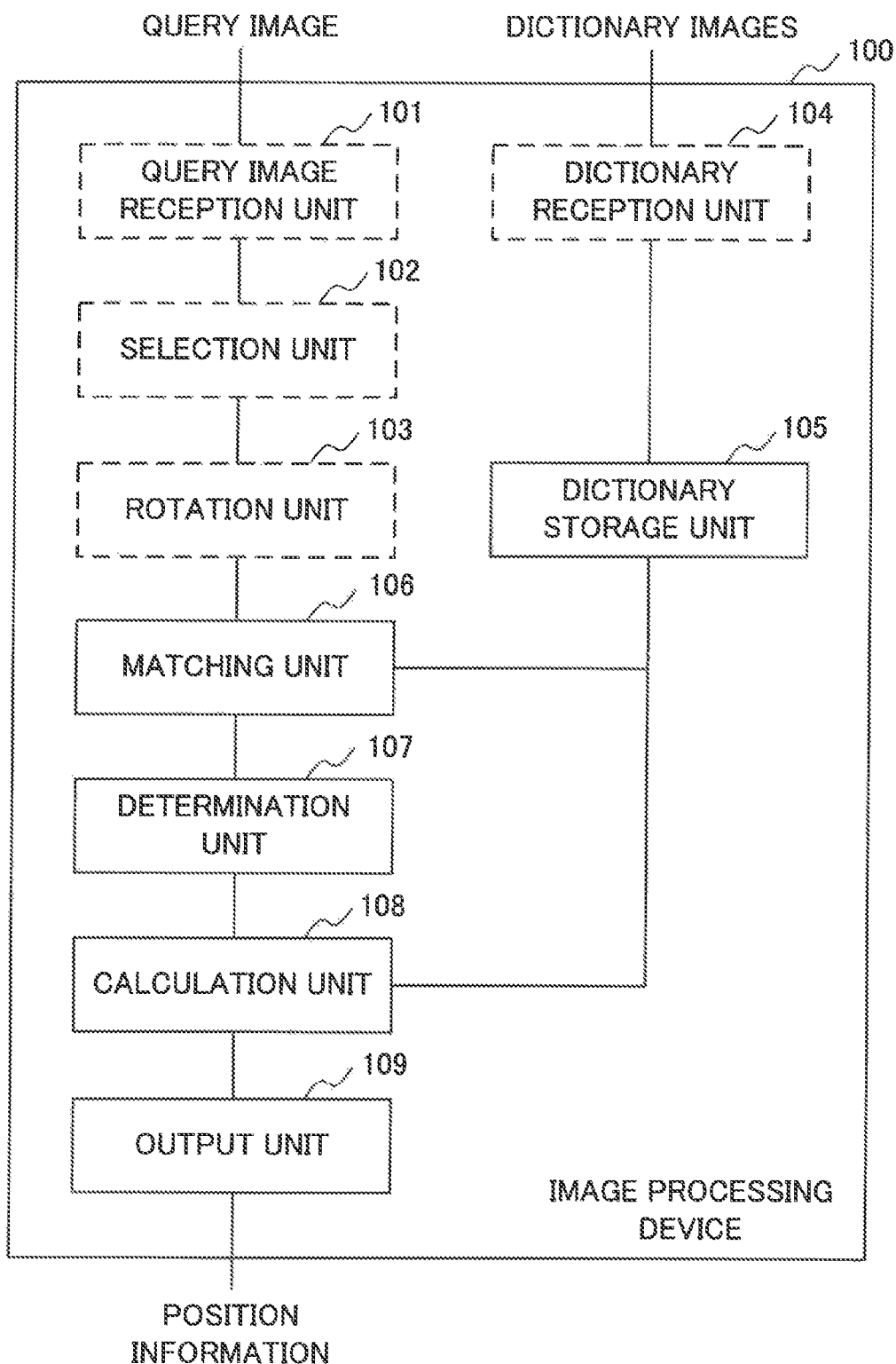
FIG. 7 is a block diagram showing an example of active units of the image processing device in the matching phase according to the first exemplary embodiment of the present invention.

FIG. 7 is a block diagram showing an example of active units in a matching phase of the image processing device 100.

According to FIG. 6, the matching unit 106 receives, from the rotation unit 103, the rotated area image for which particle positions are not given (Step S301). The rotation unit 103 may send the rotation image to the matching unit 106.

Then the matching unit 106 selects a dictionary image from the dictionary images (Step S302). The matching unit 106 matches the rotated area image with the selected dictionary image (Step S302). The matching unit 106 may search every possible relative position between the rotated area image and the selected dictionary image for a matching position at which the rotated area image best matches the selected dictionary image on the basis of, for example, a matching score representing a similarity between overlapping areas of the rotated area image and the selected dictionary image. The matching unit 106 detects the best matching position at which best matching score is derived for the rotated area image and the selected dictionary image.

The matching unit 106 records the best matching position and the best matching score for the rotated area image and the selected dictionary image (Step S303). When not all the dictionary images are matched with the rotated area image (NO in Step S305), the operation of the image processing device 100 returns to Step S302, and the operations of Steps S303 and S304 are repeated until all dictionary images are matched with the rotated area image (YES in Step S305).

The matching unit 106 may calculate a normalized cross correlation as the matching score. Examples of an equation to calculate the normalized cross correlation is shown in Math. 1 and Math. 2 described below. In the equation shown in Math. 1 and Math. 2, $S(x, y)$ is the score at a position (e.g. a pixel) whose coordinates are represented by $(x, y)$ on the dictionary image, $d(x, y)$ is, for example, an intensity of a pixel at the position (x, y) of the dictionary image, q(x, y) is, for example, an intensity of a pixel at the position (x, y) of the rotated input image.

$$S(x, y) = \frac{\sum_i \sum_j \{d(x+i, y+j)q(i, j)\}}{\sqrt{\sum_i \sum_j (d(x+i, y+j))^2} \sqrt{\sum_i \sum_j (q(i, j))^2}} \quad [\text{Math. 1}]$$

The example of the equation shown in Math. 2 is an equation to calculate the matching score of zero-means normalized cross correlation. In Math 2, $m_d$ is an average intensity in the dictionary image, and $m_q$ is an average intensity in the rotated input image.

$$S(x, y) = \frac{\sum_i \sum_j \{(d(x+i, y+j) - m_d)(q(i, j) - m_q)\}}{\sqrt{\sum_i \sum_j (d(x+i, y+j) - m_d)^2} \sqrt{\sum_i \sum_j (q(i, j) - m_q)^2}} \quad [\text{Math. 2}]$$

When all the dictionary images are matched with the rotated area image (YES in Step S305), the determination unit 107 determines a best matched dictionary image by identifying a best score among the best matching scores of all the dictionary images (Step S306). The determination unit 107 extracts a best matched area in the best matched dictionary image by extracting an area overlapping the rotated area image at the best matching position from the best matched dictionary image.

The calculation unit 108 then calculates the particle positions in the input image on the basis of the given particle positions in the best matched area extracted by the determination unit 107, the angle of rotation in Step S104, the position at which the extracted area is extracted from the input image in Step S102A and the like (Step S307).

After the matching phase, the output unit 109 outputs position information.

According to the present exemplary embodiment, it is possible to avoid inaccuracy of inferring a position of an object due to wrong model assumption. The reason is that the calculation unit 108 calculates positions of particles in the input image based on the similarity of the input image to the particle images including the areas of the particles, whose true positions in the particle images are given, at the relative positions.

Second Exemplary Embodiment

A second exemplary embodiment of the present invention will be explained in detail with reference to drawings.

Figure 8:
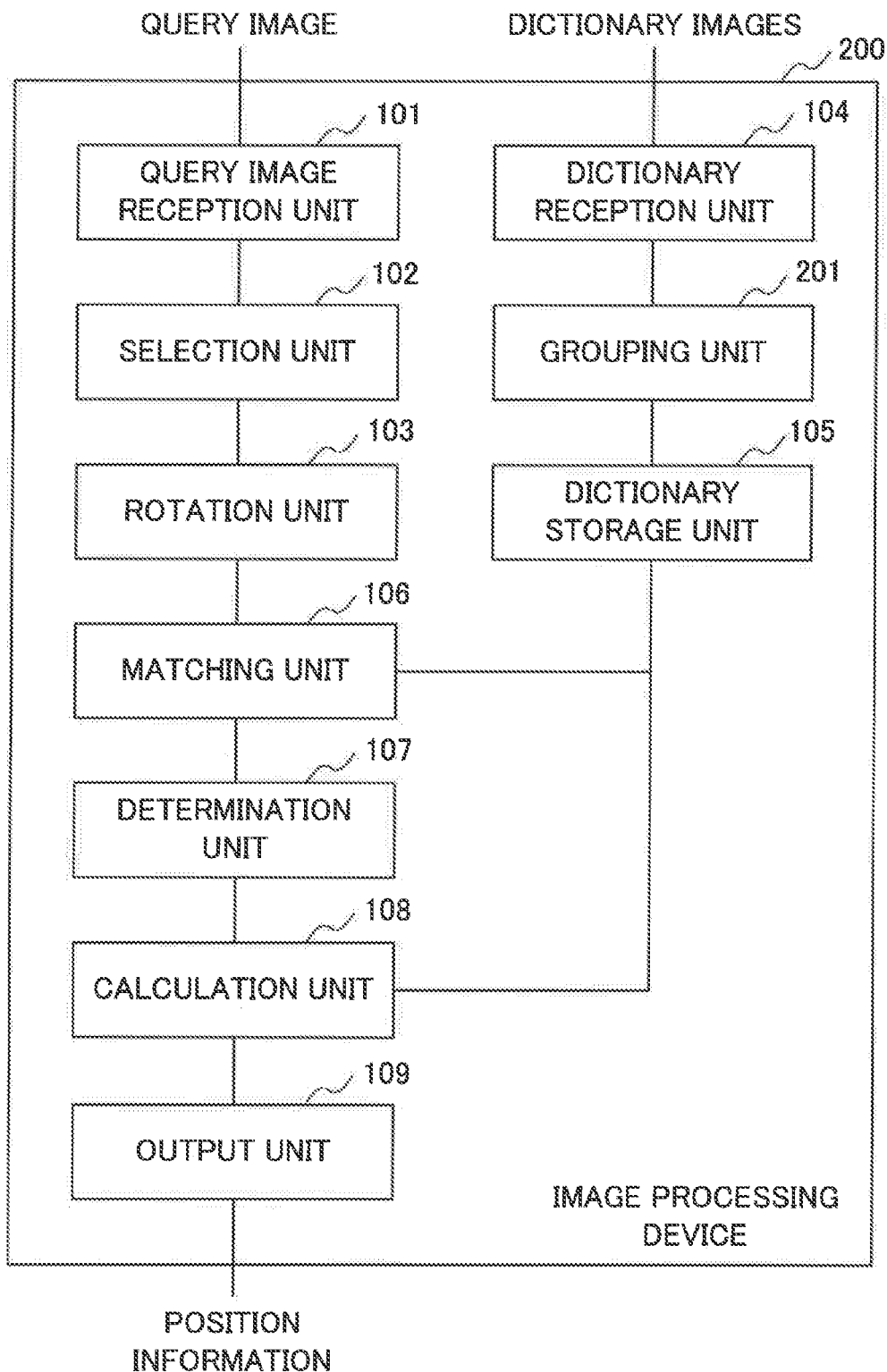
FIG. 8 is a block diagram showing an example of a structure of an image processing device according to the second exemplary embodiment of the present invention.

FIG. 8 is a block diagram showing an example of a structure of an image processing device 200 according to the second exemplary embodiment of the present invention.

The image processing device 200 includes the same components as the components included in the image processing device 100 of the first exemplary embodiment. The detailed explanation of those components is omitted except the difference described below. The image processing device 200 further includes a grouping unit 201.

The grouping unit 201 performs grouping the dictionary images into sub-groups on the basis of the distances between two particles in the dictionary images. The grouping unit 201 may estimate the distance between two particles by calculating a distance between the true particle positions each representing the positions of the two particles.

The determination unit 107 of the present exemplary embodiment performs voting for one of the sub-groups on the basis of the matching score of the rotated area image and each of the dictionary images. The determination unit 107 may calculate a sum of matching scores voted for each of the sub-groups. The determination unit 107 determines (i.e. identifies) the sub-group having the sum representing the best among sums of matching scores for the sub-groups.

Operations of the image processing device 200 according to the exemplary embodiment will be explained in detail with reference to drawings.

Figure 9:
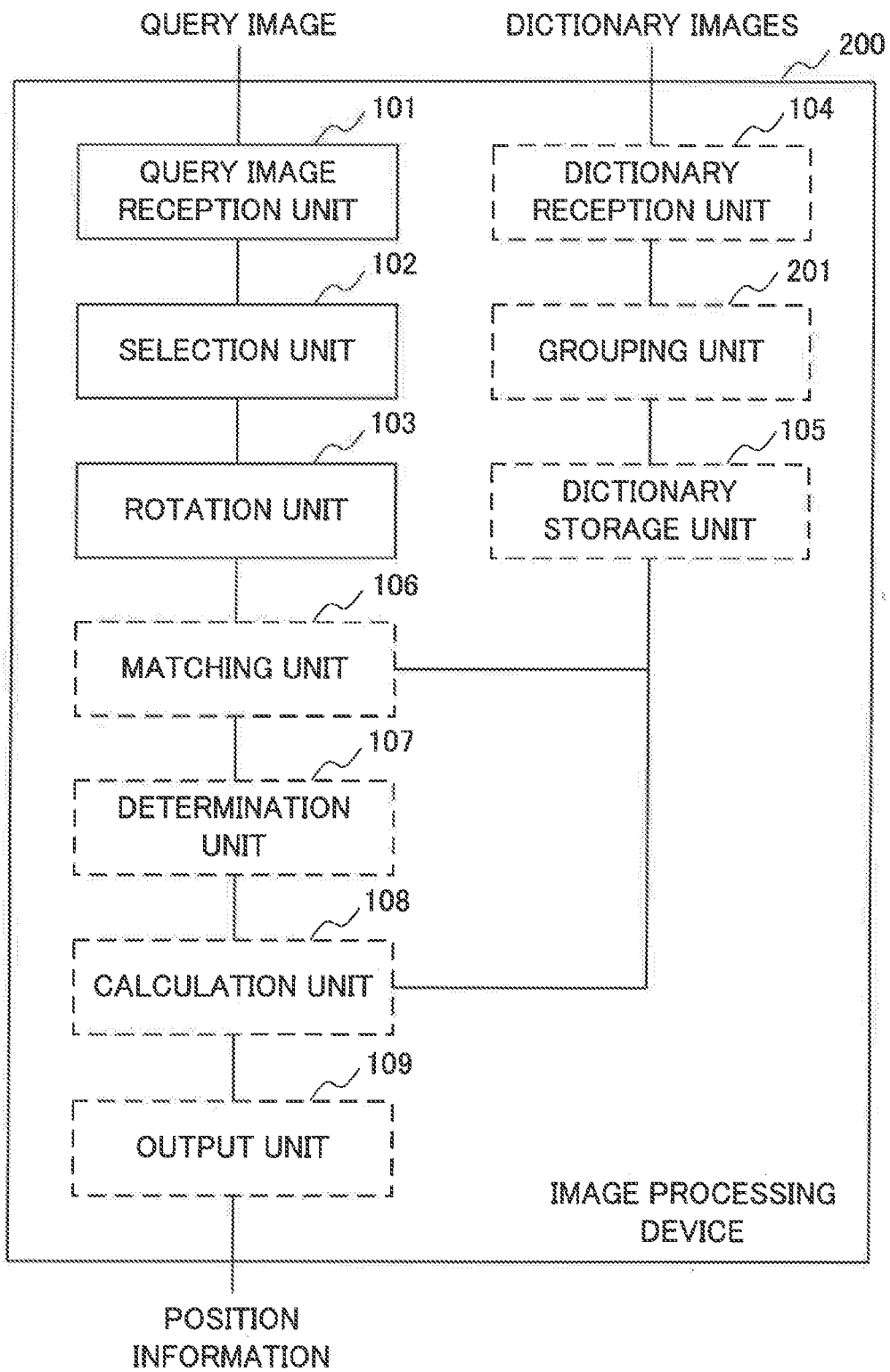
FIG. 9 is a block diagram showing an example of active units of the image processing device in a query phase according to the second exemplary embodiment of the present invention.

FIG. 9 is a block diagram showing an example of active units of the image processing device 200 in the query generation phase. The active units in the query generation phase include the query image reception unit 101, the selection unit 102 and the rotation unit 103. The active units are drawn by solid lines, and other units are drawn by broken lines.

FIG. 2 is a flow chart showing an example of operation of the image processing device 200 in the query generation phase. The operation in the query generation phase of the image processing device 200 is the same as the operation in the query generation phase of the image processing device 100 according to the first exemplary embodiment. Therefore, detailed explanation of the operation in the query generation of the image processing device 200 is omitted.

Figure 10:
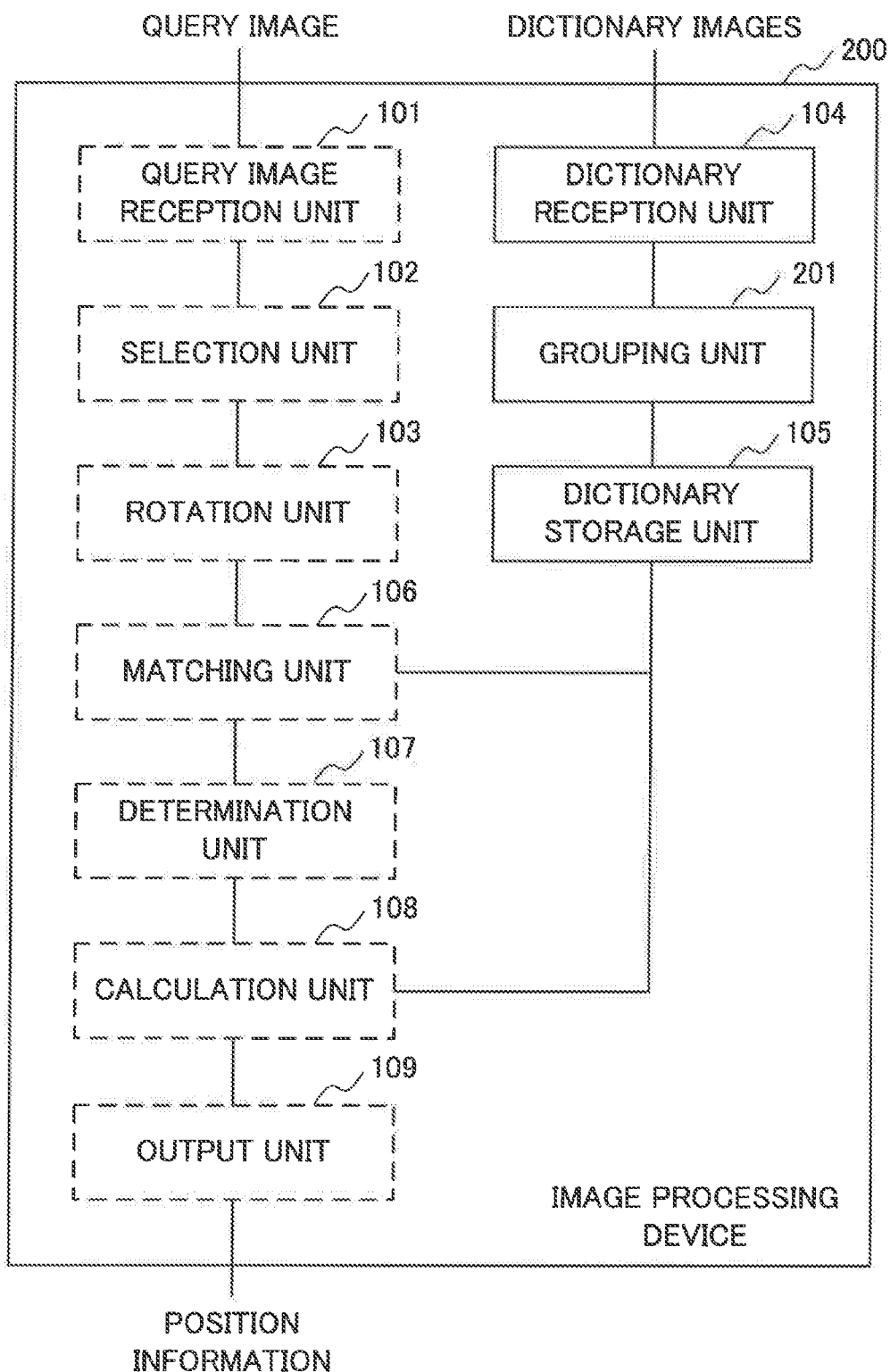
FIG. 10 is a block diagram showing an example of active units of the image processing device in a training phase according to the second exemplary embodiment of the present invention.

FIG. 10 is a block diagram showing an example of active units of the image processing device 200 in a training phase. In the training phase, units which operate in the image processing device 200 are the dictionary reception unit 104, the grouping unit 201 and the dictionary storage unit 105. In FIG. 10, the active units are shown in solid lines, and other units are shown in broken lines.

Figure 11:
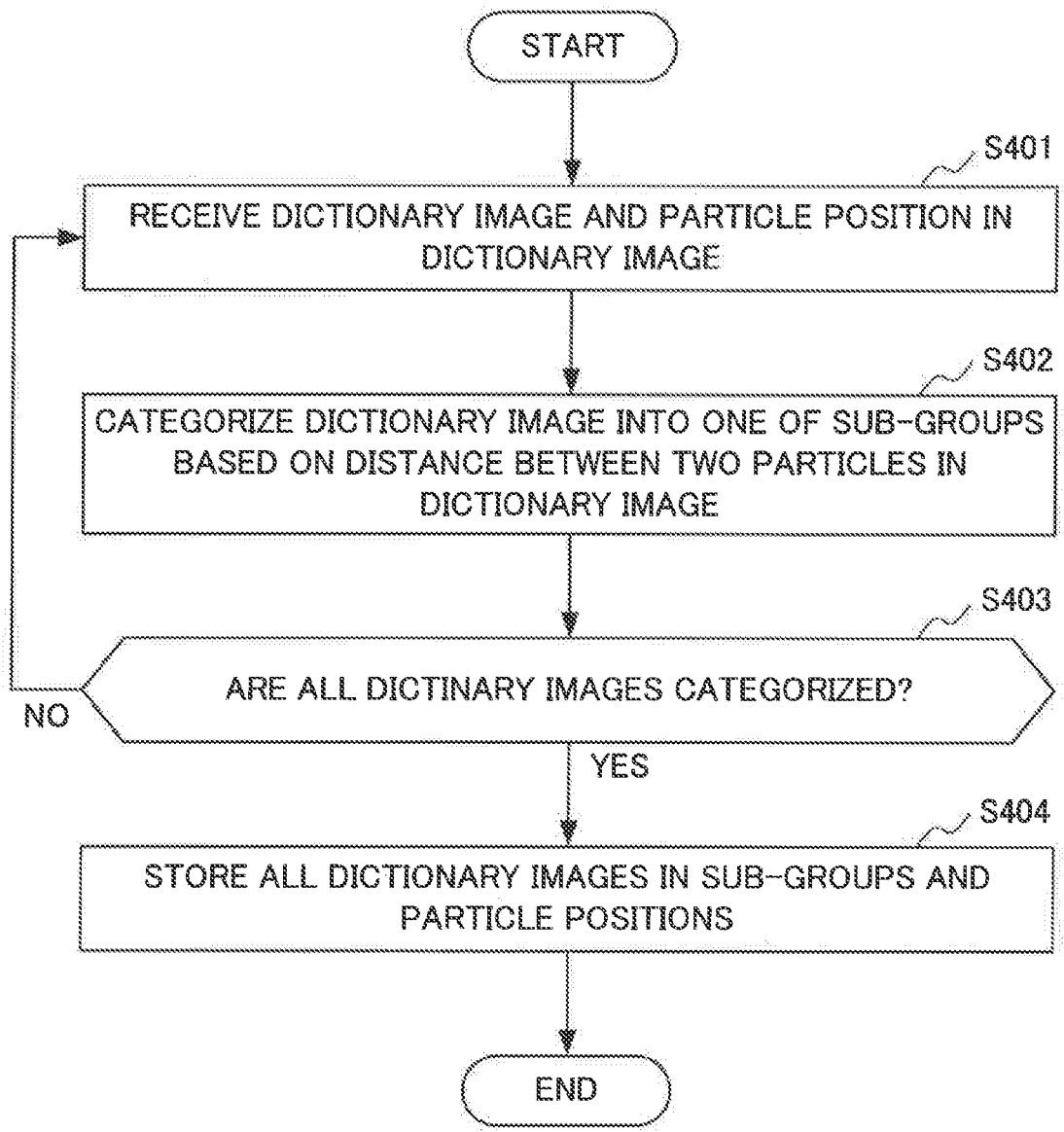
FIG. 11 is a flow chart showing an example of operation of the image processing device in the training phase according to the second and the third exemplary embodiments of the present invention.

FIG. 11 is a flow chart showing an example of operation of the image processing device 200 in the training phase.

The dictionary reception unit 104 receives an image (i.e. dictionary image) with true particle positions of the image, which are given in advance and known (Step S401). Step S401 shown in FIG. 11 is the same as Step S201 of the first exemplary embodiment, which is shown in FIG. 4.

Similar to the first exemplary embodiment, each of dictionary images including the above-mentioned dictionary image includes image areas of two particles. True particle positions of the two particles are given for each of the dictionary images. In the present exemplary embodiment, the dictionary images categorized to the same sub-group have the common true particle positions.

One (first position) of the two particle positions may be common for each of the dictionary images. The other (second position) of the two particle positions may be on a horizontal line across the first position and on a prefixed side (e.g. left side or right side) of the first position. The dictionary images may be generated as follows.

The dictionary images may be synthesized by a dictionary image generation apparatus (not illustrated but communicably connected with the image processing device 200) so that the particle positions of a dictionary image (first dictionary image) of the dictionary images are the same as the particle position of another dictionary image (second dictionary image) of the dictionary images when the distance between the particle positions of the first dictionary image is the same as the distance between the particle positions of the second dictionary image. More specifically, the dictionary image generation apparatus may select the distance between the particle positions in a dictionary image from a plurality of distances set in advance. The dictionary image generation apparatus may synthesize the dictionary images so that one of the two particle positions is common (e.g. a prefixed position) for each of the dictionary images, and the other of the two particle positions are set according to the selected distance.

The dictionary image generation apparatus may rotate original images (e.g. microscopic images) including an area of two particles so that a line across two particle positions, which may be pointed or input by an operator, becomes horizontal in each of the rotated original images. The dictionary image generation apparatus may extract the dictionary images from rotated original images so that one (first position) of the two particle positions is a prefixed position and the other of the two particle positions is on the prefixed side of the first position.

Detailed explanation of Step S401 is omitted.

The grouping unit 201 receives the dictionary image with the true particle positions from the dictionary reception unit 104. The grouping unit 201 categorizes the dictionary image into one of sub-groups on the basis on a distance between the two particles in the dictionary image (Step S402). The grouping unit 201 may calculate, as the distance between the two particles in the received dictionary image, a distance between the two particle positions of the received dictionary image.

Each of the sub-groups is correlated with an interval in intervals of distance and with a representative distance representing the interval. The intervals are arranged so as not to overlap among them. The representative distance of the interval may be a maximum, a minimum, a center or other distance of the interval.

When the distance between two particle positions of the dictionary image is included in an interval of the intervals, the grouping unit 201 categorizes the dictionary image into a sub-group which is correlated with an interval including the distance between two particle positions. The dictionary images may be generated so that the particle positions of the two particles are the same for the dictionary images whose distances between the two particles are the same. The grouping unit 201 may correlate the dictionary image with the sub-group into which the dictionary image is categorized and the true particle positions which are received with the dictionary image.

When not all the dictionary images are categorized (NO in Step S403), the operation of the image processing device 200 returns to Step S401.

After all the dictionary images are categorized into subgroups (YES in Step S403), the grouping unit 201 stores, in the dictionary storage unit 105, all the dictionary images each correlated with one sub-groups and the true particle positions (Step S404).

Figure 12:
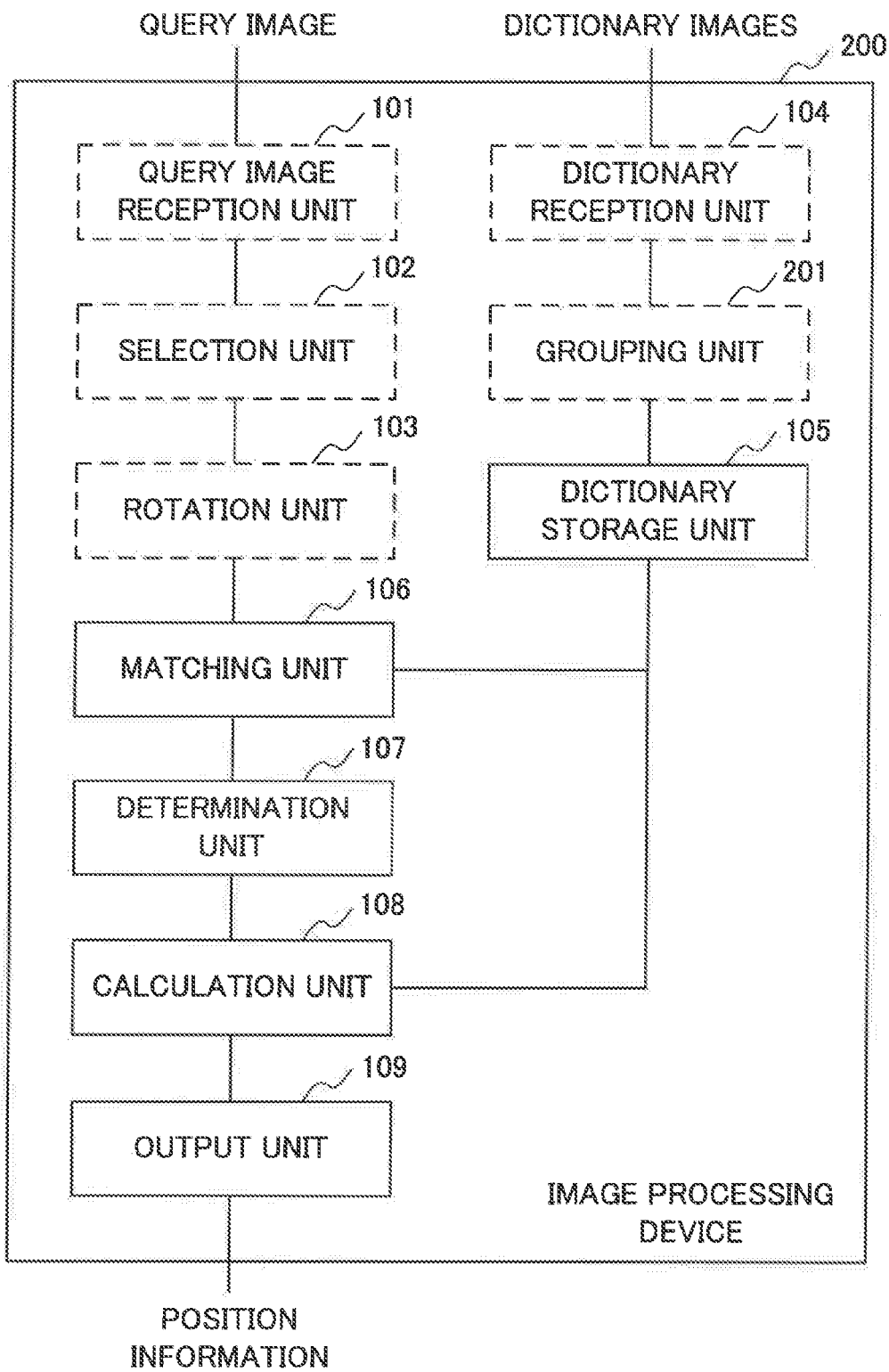
FIG. 12 is a block diagram showing an example of active units of the image processing device in a matching phase according to the second exemplary embodiment of the present invention.

FIG. 12 is a block diagram showing an example of active units of the image processing device 200 in a matching phase. In the matching phase, the active units which operate in the image processing device 200 are the dictionary storage unit 105, the matching unit 106, the determination unit 107 and the calculation unit 108. In FIG. 12, the active units are drawn in solid lines, and other units are drawn by broken lines.

Figure 13:
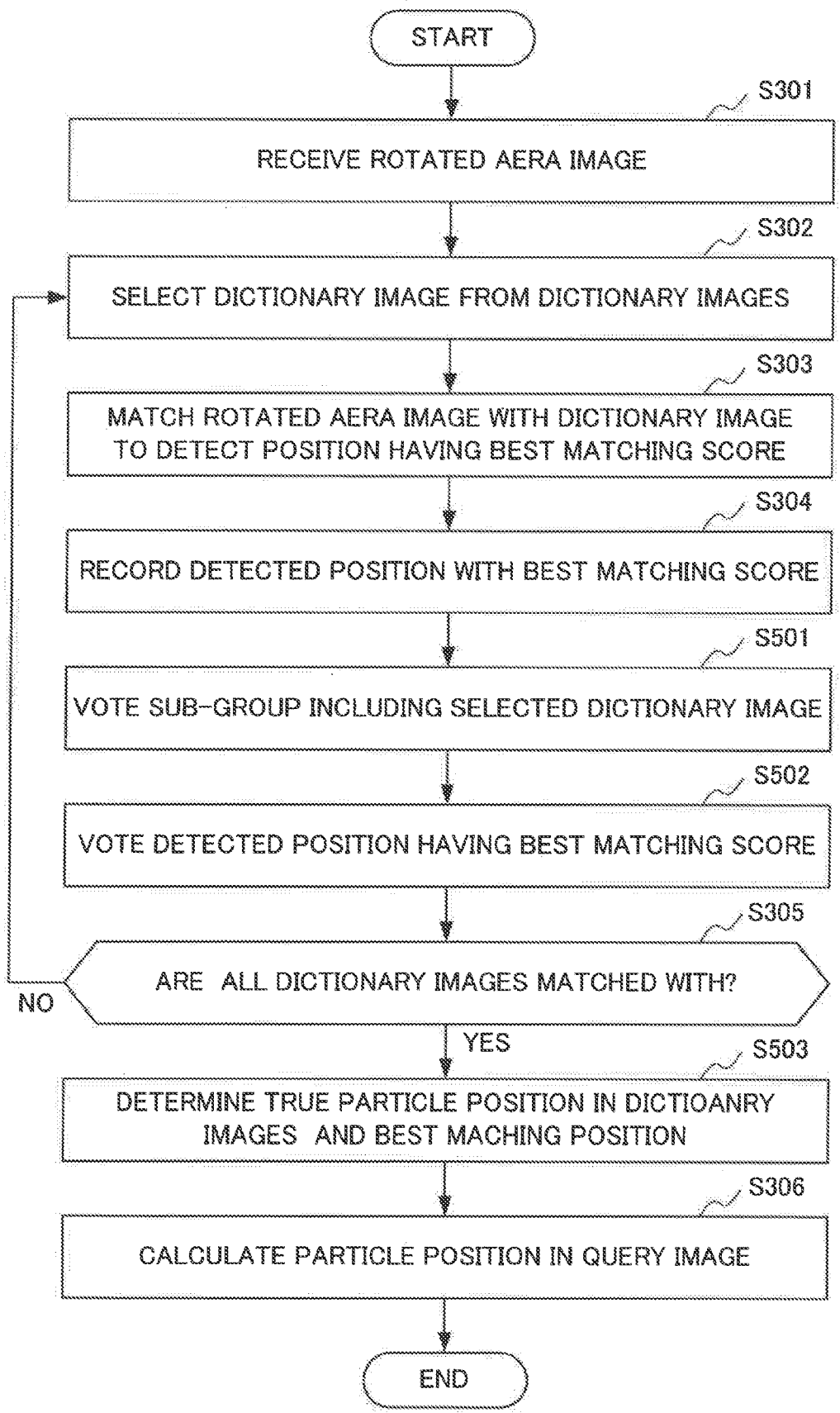
FIG. 13 is a flow chart showing an example of operation of the image processing device in the matching phase according to the second and the third exemplary embodiments of the present invention.

FIG. 13 is a flow chart showing an example of operation of the image processing device 200 in the matching phase.

Steps S301 to S306 shown in FIG. 13 are the same as those of the first exemplary embodiment, which are shown in FIG. 6. Detailed explanation of those steps is omitted. Operation of Steps S501, S502 and S503 is described below in detail.

In Step S303, the matching unit 106 drives the best matching score for the rotated area image received in Step S301 and the dictionary image selected and read out from the dictionary storage unit 105 in Step S302, and detects the best matching position at which the best matching score is derived. In Step S304, the matching unit 106 records the detected best matching position and the derived best matching score.

The determination unit 107 then votes, with the best matching score recorded in Step S304, the sub-group to which the dictionary image selected in Step S302 is categorized (Step S501).

When the matching score is larger as the rotated area image and the dictionary image matches better at a relative position at which the matching score is derived, the determination unit 107 may vote the sub-category with the best matching score by adding the best matching score to a summation score (i.e. voting score) of the sub-category. When the matching score is smaller as the rotated area image and the dictionary image matches better at a relative position at which the matching score is derived, the determination unit 107 may convert the best matching score to a score so that the converted score is larger as the matching score is smaller. The determination unit 107 may vote the sub-category with the converted score by adding the converted score to the summation score of the sub-category.

The determination unit 107 votes the best matching position in the dictionary image with the best matching score recorded in Step S304 (Step S502). When voting the best matching position with the best matching score, the determination unit 107 may vote coordinates of the best matching position with the best matching score. The determination unit 107 may vote an area including the best matching position with the best matching score. The area is one of areas generated by dividing a space of a relative position of the rotated area image and the dictionary images.

When the matching score is larger as the rotated area image and the dictionary image matches better at a relative position at which the matching score is derived, the determination unit 107 may vote the best matching position with the best matching score by adding the best matching score to a summation score (i.e. voting score) of the best matching position. When the matching score is smaller as the rotated area image and the dictionary image matches better at a relative position at which the matching score is derived, the determination unit 107 may convert the best matching score to a score so that the converted score is larger as the matching score is smaller. The determination unit 107 may vote the best matching position with the best matching score by adding the converted score to the summation score of the best matching position.

In Step S502, the determination unit 107 may calculate the summation scores of the best matching positions for each of the sub-groups independently. In other words, the determination unit 107 may calculate the summation scores of the best matching positions for a sub-group in the sub-groups by using the matching scores between the rotated area image and the dictionary images which is categorized to the sub-group.

When all the dictionary images are matched with the rotated area image (YES in Step S305), the determination unit 107 determines the true particle position of the best matched dictionary image on the basis of the result of voting in Step S501. The determination unit 107 may determine the true particle position of the best matched dictionary image by selecting the sub-group having the best (i.e. highest) summation score (voting score) calculated in Step S501 and by estimating, as the true particle position of the best matched dictionary image, the true particle positions of the dictionary images categorized to the sub-group whose summation score is the best. As described above, in the present exemplary embodiment, the dictionary images categorized to the same sub-group have the common true particle positions.

The determination unit 107 determines the best matching position between the rotated area image and the dictionary images categorized to the determined sub-group on the basis of the result of voting in Step S502. The determination unit 107 may determine the best matching position between the rotated area image and the dictionary images categorized to the determined sub-group by selecting the best matching position having the best (i.e. the highest) summation score (Step S503).

The calculation unit 108 then calculates the particle positions of the input image by using the true particle positions of the sub-group having the highest vote (i.e. the highest summation score), the best matching position having the highest vote, the translation of rotation in Step S104 and the position at which the extracted area is extracted in S102A (Step S306). The calculation unit 108 may calculate the particle positions of the input image in the same way as the calculation unit 108 of the image processing device 100 according to the first exemplary embodiment of the present invention.

After the matching phase, the output unit 109 outputs position information.

The image processing device according to the present exemplary embodiment is able to estimate the true particle position of the input image more accurately. The reason is that the determination unit 107 determines the true particle positions in the dictionary image and the best matching position on the basis of the results of voting and therefore false matching due to a noise is reduced.

Third Exemplary Embodiment

A third exemplary embodiment of the present invention will be explained in detail with reference to drawings.

Figure 14:
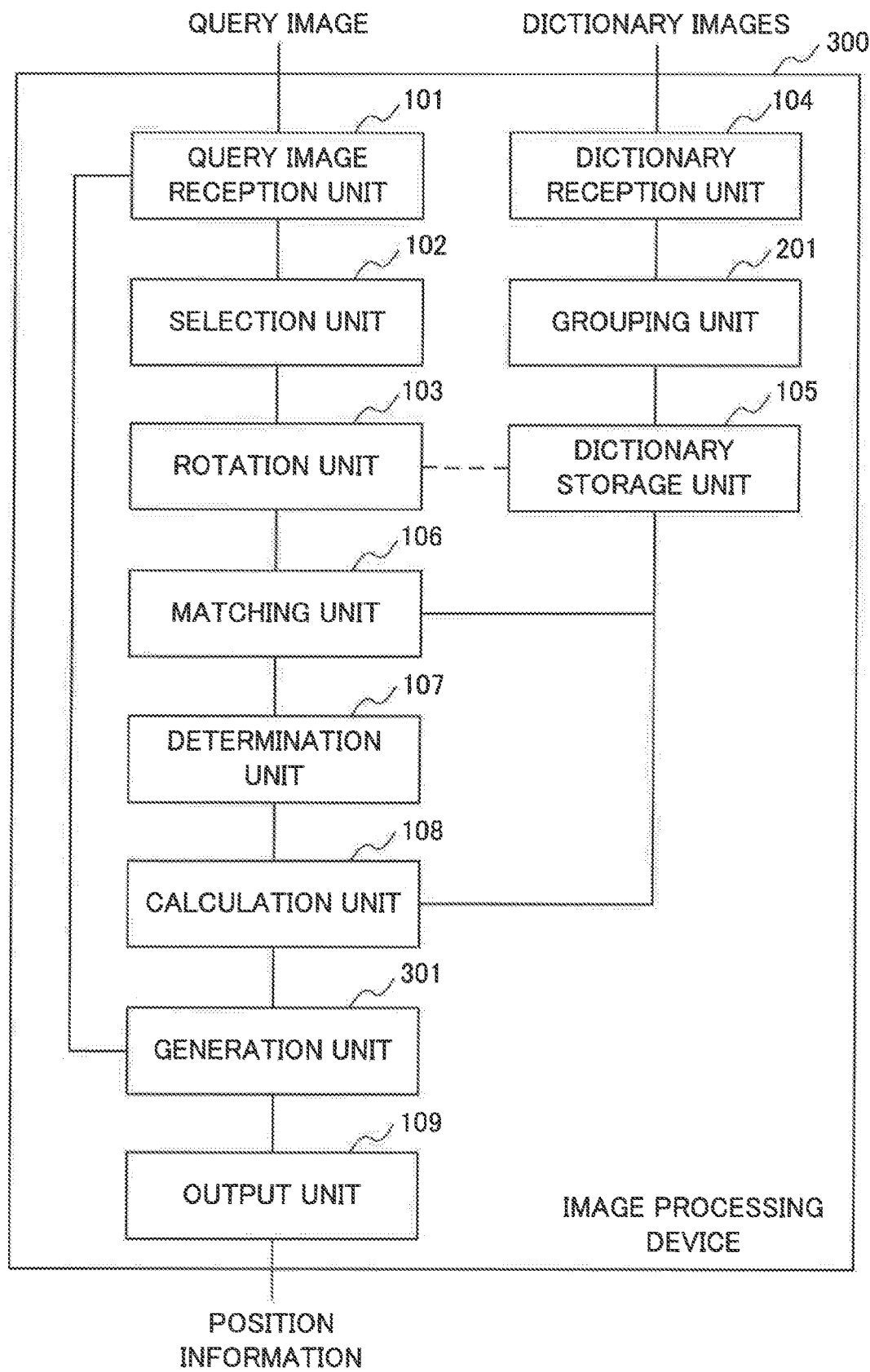
FIG. 14 is a block diagram showing a first example of a structure of an image processing device according to the third exemplary embodiment of the present invention.

FIG. 14 is a block diagram showing an example of a structure of an image processing device 300 according to the third exemplary embodiment of the present invention.

The image processing device 300 includes the same components as the components included in the image processing device 200 of the second exemplary embodiment. The detailed explanation of the components is omitted except the differences described below. The image processing device 300 further includes a generation unit 301.

The generation unit 301 generates a modified image which clearly shows the particle positions, in the original input image, calculated by the calculation unit 108. The generation unit 301 may generate the modified image by modifying the intensity of pixels in areas including the particle positions so that the areas including the particle positions stand out.

The generation unit 301 may determine, in the input image, the areas where the intensity of pixels is modified (hereinafter, referred to as "modified areas") on the basis of the particle positions calculated by the calculation unit 108. More specifically, the generation unit 301 may determine the modified areas so that the modified areas each include one of the particle positions. The modified areas may be circular areas whose center is at one of the particle positions. The circular areas may have a preset radius not smaller than a typical radius of the particle areas in the input image. The typical radius of the particle areas may be determined theoretically. The typical radius of the particle areas may be determined experimentally. The areas determined by the generation unit 301 are not limited to above-mentioned example.

The generation unit 301 may generate an image (i.e. the modified image) by modifying the intensity of pixels included in the determined areas of the input image. The generation unit 301 may generate the modified image by enhancing contrast of intensity of pixels included in the modified areas. The generation unit 301 may generate the modified image by increasing intensity of pixels included in the modified areas. The generation unit 301 may generate the modified image by decreasing, in the input image, intensity of pixels included in the modified areas. The generation unit 301 may generate the modified image by a method other than the above example. The generation unit 301 may generate the modified image by modifying the determined areas of the input image so that the particle positions become clear in the input image.

Operations of the image processing device according to the exemplary embodiment will be explained in detail with reference to drawings.

FIG. 2 is a flow chart showing an example of operation of the image processing device 300 in the query generation phase. The operation of the image processing device 300 in the query generation phase is the same as the operation of the image processing device 100 according to the first exemplary embodiment in the query generation phase. Therefore, detailed explanation of the operation of the image processing device 300 in the query generation phase is omitted.

FIG. 11 is a flow chart showing an example of operation of the image processing device 300 in the training phase. The operation of the image processing device 300 in the training phase is the same as the operation of the image processing device 200 in the training phase according to the second embodiment. Detailed explanation of the operation of the image processing device 300 in the training phase is omitted.

FIG. 13 is a flow chart showing an example of operation of the image processing device 300 in the matching phase. The operation of the image processing device 300 in the matching phase is the same as the operation of the image processing device 200 according to the second exemplary embodiment in the matching phase. Detailed explanation of the operation of the image processing device 300 in the matching phase is omitted.

After the matching phase, the image processing device 300 performs operation in an image generation phase.

Figure 15:
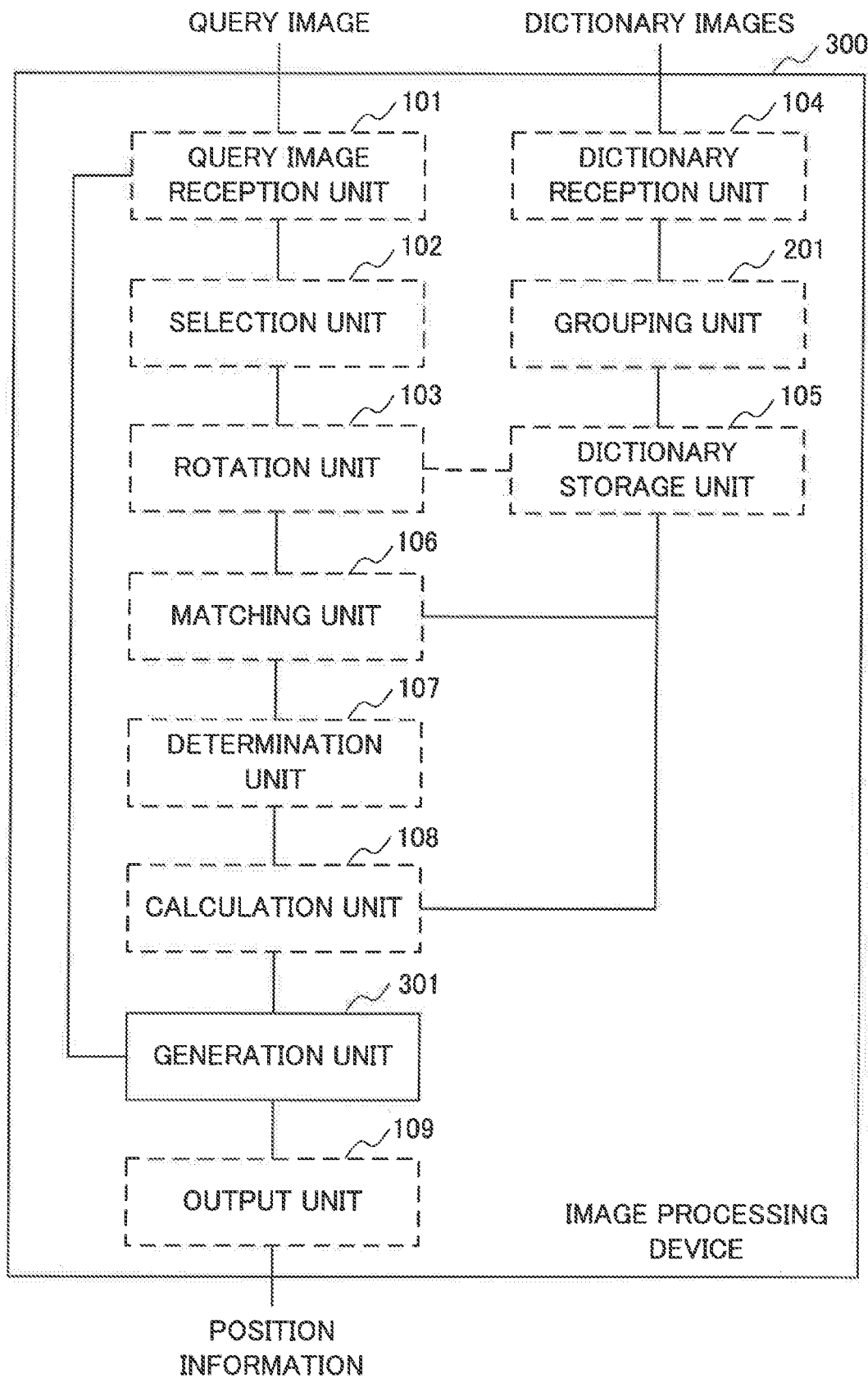
FIG. 15 is a block diagram showing an example of active units of the image processing device in an image generation phase according to the third exemplary embodiment of the present invention.

FIG. 15 is a block diagram showing an example of active units of the image processing device 300 in the image generation phase. In the image generation phase, the active units include the generation unit 301. In FIG. 15, the generation unit 301 is illustrated in solid lines, and units other than the generation unit 301 are drawn by broken lines.

Figure 16:
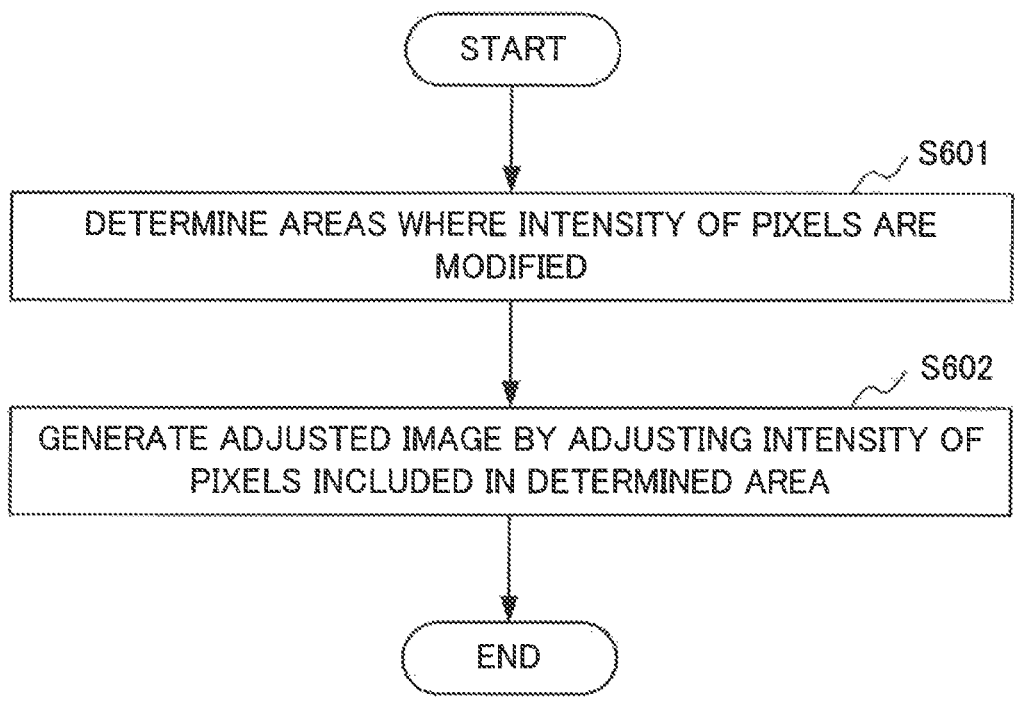
FIG. 16 is a flow chart showing an example of operation of the image processing device in the image generation phase according to the third exemplary embodiment of the present invention.

FIG. 16 is a flow chart showing an example of operation of the image processing device 300 in the generation phase.

The generation unit 301 receives the input image from the query image reception unit 101. The generation unit 301 determines the modified areas that are areas where intensity of pixels are modified (Step S601). As described above, the modified areas each include one of the particle positions.

Then the generation unit 301 generates the modified image by modifying the intensity of the pixels included in modified area determined in Step S601 (Step S602).

After the generation phase, the output unit 109 output the modified image generated by the generation unit 301 as the position information.

Figure 18:
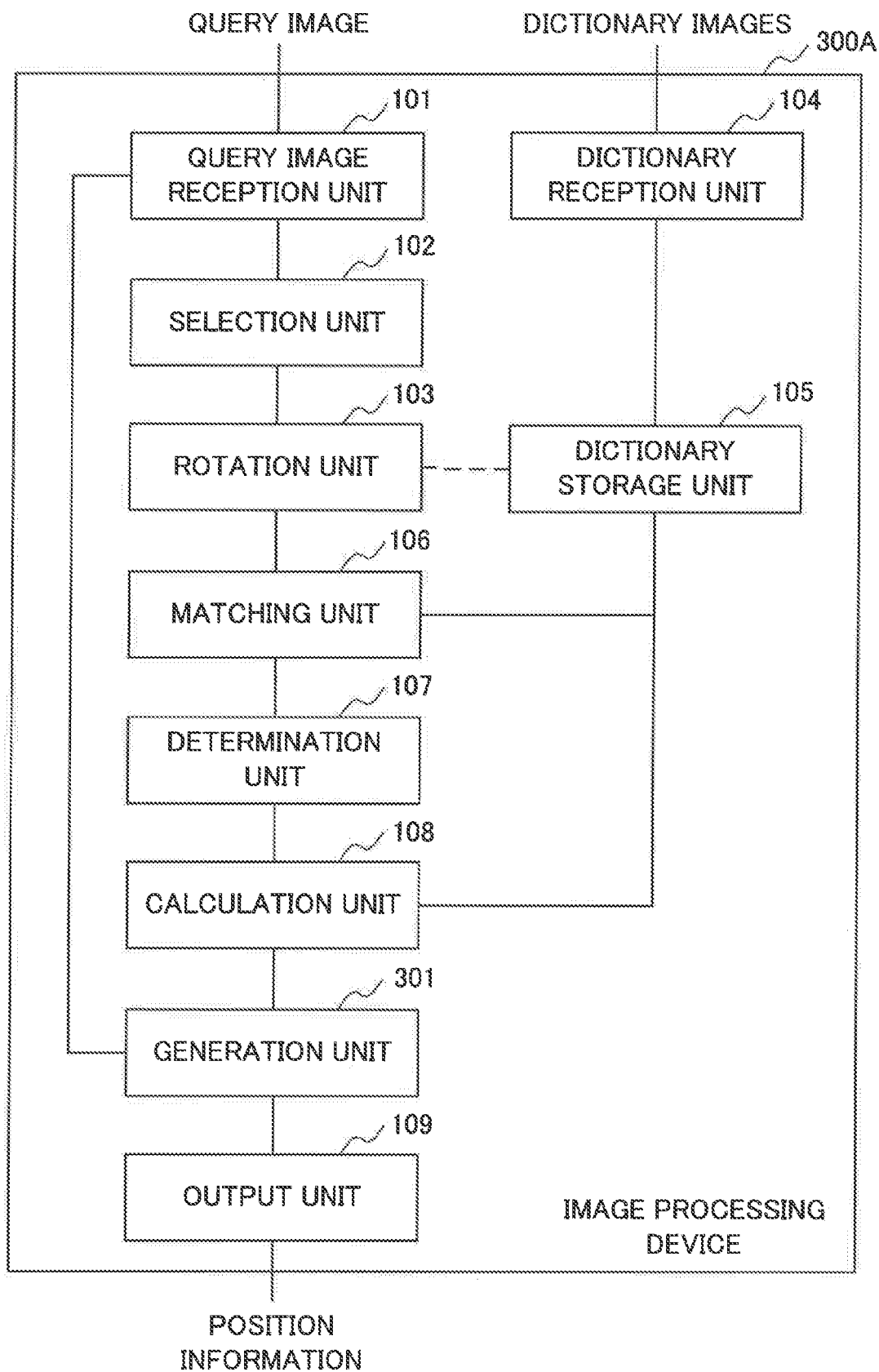
FIG. 18 is a block diagram showing a second example of the image processing device according to the third exemplary embodiment of the present invention.

FIG. 18 is a block diagram illustrating a second example of a structure of the image processing device 300A according to the third exemplary embodiment. The image processing device 300A is a modification of the image processing device 300. The image processing device 300A includes the components of the image processing device 100 of the first exemplary embodiment. The image processing device 300A further includes generation unit 301. The generation unit 301 is the same as the above-described generation unit 301 of the third exemplary embodiment. The output unit 109 is the same as the above-described output unit 109 of the third exemplary embodiment. The other components of the image processing device 300A are the same as the components of the image processing device 100 of the first exemplary embodiment.

The image processing device 300 of the present exemplary embodiment of the present invention has the same effect as that of the image processing device 200 of the second exemplary embodiment of the present invention.

According to the present exemplary embodiment, it is possible to make the particle positions stand out. The reason is that the generation unit 301 generates the modified image including modified areas each of which includes one of the particle positions and each of which includes pixels whose intensity is modified.

Fourth Exemplary Embodiment

A fourth exemplary embodiment of the present invention is described in detail with reference to drawings.

Figure 19:
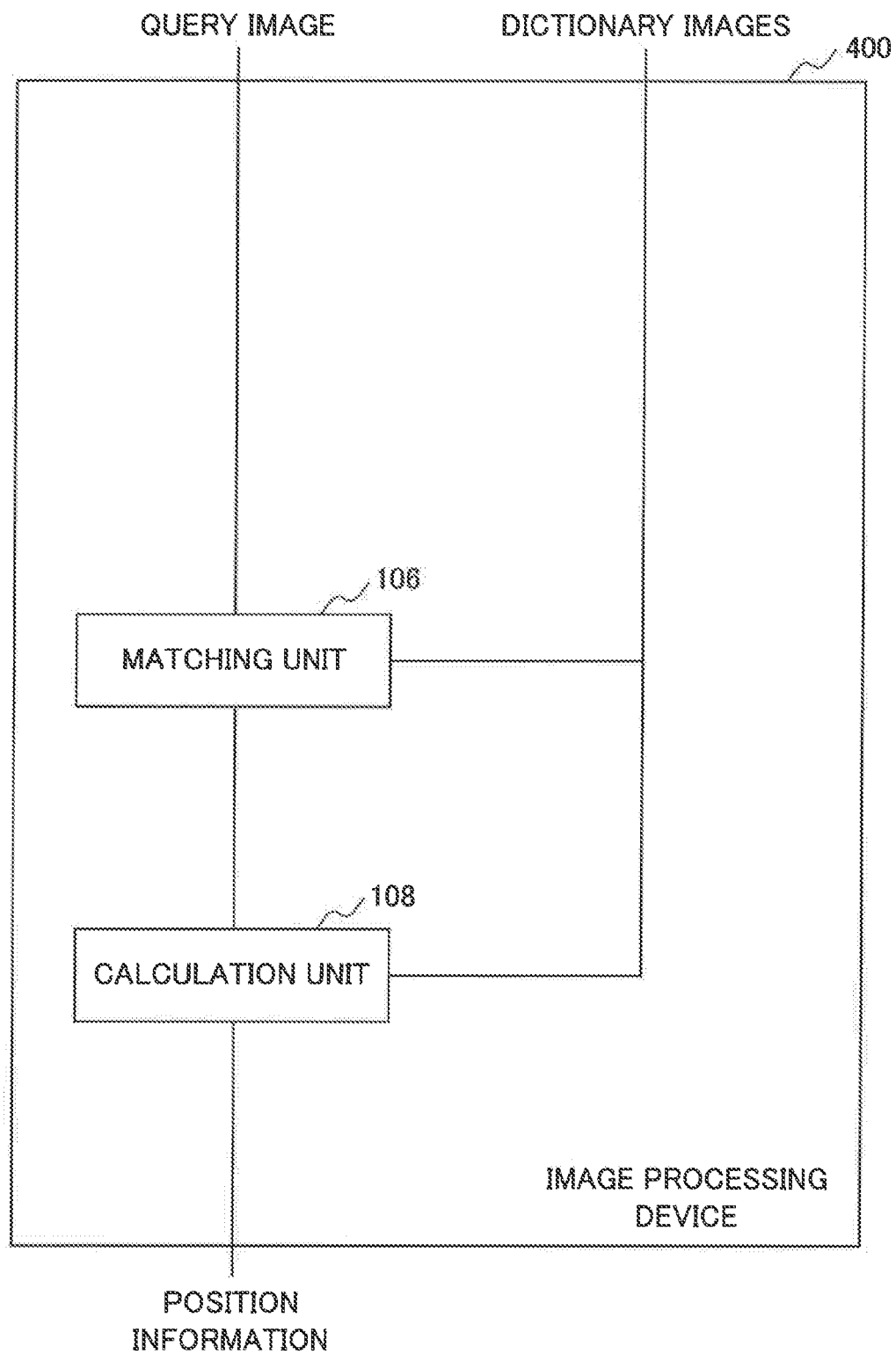
FIG. 19 is a block diagram of an image processing device according to a fourth exemplary embodiment of the present invention.

FIG. 19 is a block diagram illustrating an example of a structure of an image processing device according to the fourth exemplary embodiment of the present invention.

The image processing device 400 in FIG. 19 includes: a matching unit 106; and a calculation unit 108. The matching unit 106 estimates similarity of input image to particle images including areas of particles at relative positions. True positions of the particles in the particle images are given. The calculation unit 108 calculates positions of particles in the input image based on the similarity and the true positions.

According to the present exemplary embodiment, it is possible to avoid inaccuracy of inferring a position of an object due to wrong model assumption. The reason is that the calculation unit 108 calculates positions of particles in the input image based on the similarity of the input image to the particle images including the areas of the particles, whose true positions in the particle images are given, at the relative positions.

Other Exemplary Embodiments

Each of the image processing devices according to the exemplary embodiments of the present invention may be implemented by circuitry such as dedicated hardware (e.g. a circuit or circuits), a computer including a processor and a memory, or a combination of the dedicated hardware and the computer.

Figure 20:
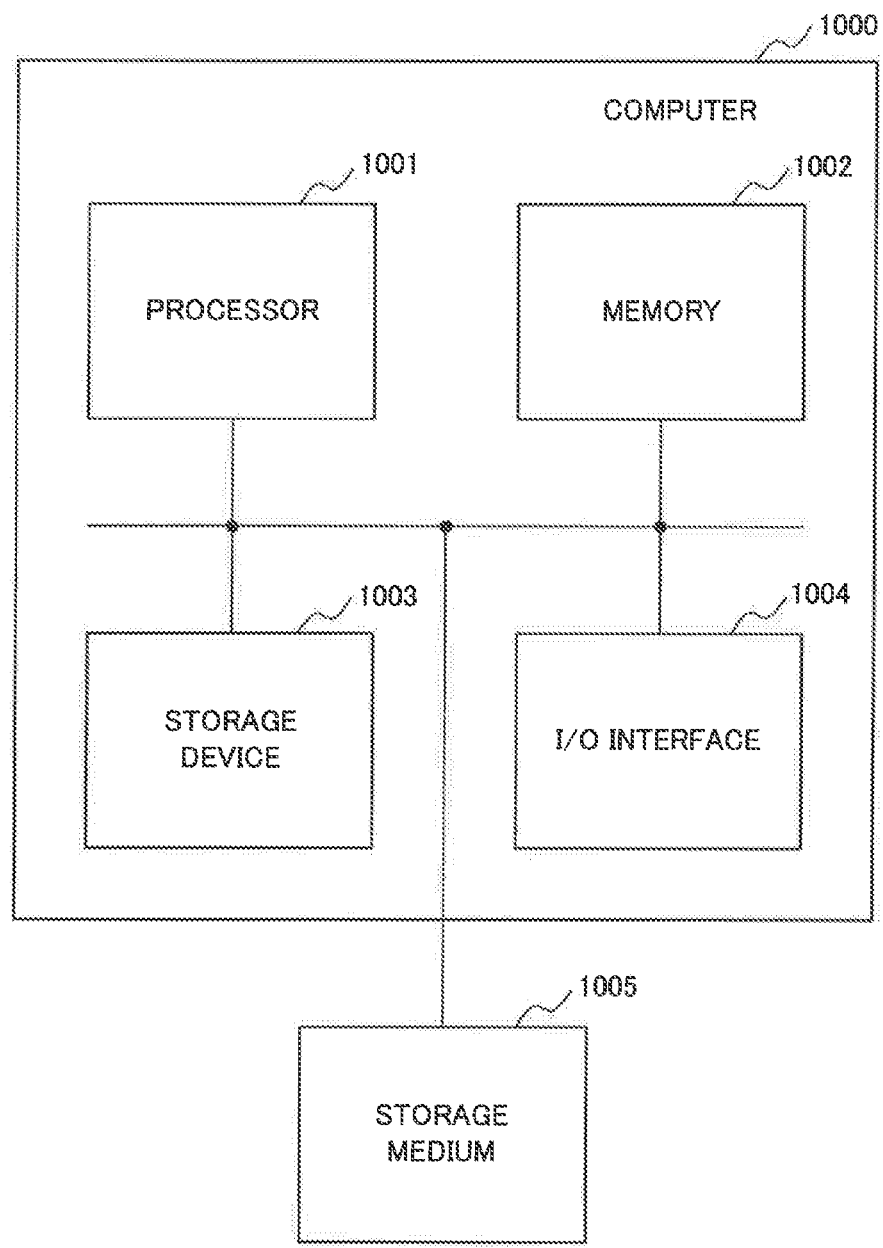
FIG. 20 is a block diagram of an example of a structure of a computer capable of operating as the image processing device according to any one of the exemplary embodiments of the present invention.

FIG. 20 is a block diagram illustrating an example of a structure of a computer which is capable of operating as each of the image processing devices according to the exemplary embodiments of the present invention.

According to FIG. 20, a computer 1000 includes a processor 1001, a memory 1002, a storage device 1003, and an I/O (Input/Output) interface 1004. The computer 1000 is able to access a storage medium 1005. The memory 1002 and the storage device 1003 are able to be implemented with such as a RAM (Random Access Memory) or a hard disk drive. The storage medium 1005 may be, for example, a RAM, a storage device such as a hard disk drive, a ROM (Read Only Memory), a portable recording medium or the like. The storage device 1003 may function as the storage medium 1005. The processor 1001 is able to read data and a program from the memory 1002 and the storage device 1003, and to write data and a program into the memory 1002 and the storage device 1003. The processor 1001 is able to access the input device (not illustrated), an apparatus providing the query image and the model images, an apparatus displaying the result of the determination through the I/O interface 1004. The processor 1001 is able to access the storage medium 1005. The storage medium 1005 stores a program causing the computer 1000 to operate as the image processing device according to any one of the exemplary embodiments of the present invention.

The processor 1001 loads the program stored in the storage medium 1005 in the memory 1002. The processor 1001 operates as the image processing device according to any one of the exemplary embodiment of the present invention by executing the program stored in the memory 1002.

The query image reception unit 101, the selection unit 102, the rotation unit 103, the dictionary reception unit 104, the matching unit 106, the determination unit 107, the calculation unit 108, the output unit 109, the grouping unit 201 and the generation unit 301 are able to be implemented with the processor 1001 controlled by the above-described program read out from the storage medium 1005 and loaded in the memory 1002.

The dictionary storage unit 105 is able to be implemented with the memory 1002 and/or the storage device 1003 such as a hard disk drive.

As described above, at least one of the query image reception unit 101, the selection unit 102, the rotation unit 103, the dictionary reception unit 104, the dictionary storage unit 105, the matching unit 106, the determination unit 107, the calculation unit 108, the output unit 109, the grouping unit 201 and the generation unit 301 is able to be implemented with dedicated hardware.

Any one or more of units included in each of the exemplary embodiment of the present invention may be implemented as a dedicated hardware (e.g. circuitry). Any one or more of the units included in each of the exemplary embodiment of the present invention may be implemented using a computer including a memory in which a program is loaded and a processor controlled by the program loaded in the memory.

Figure 21:
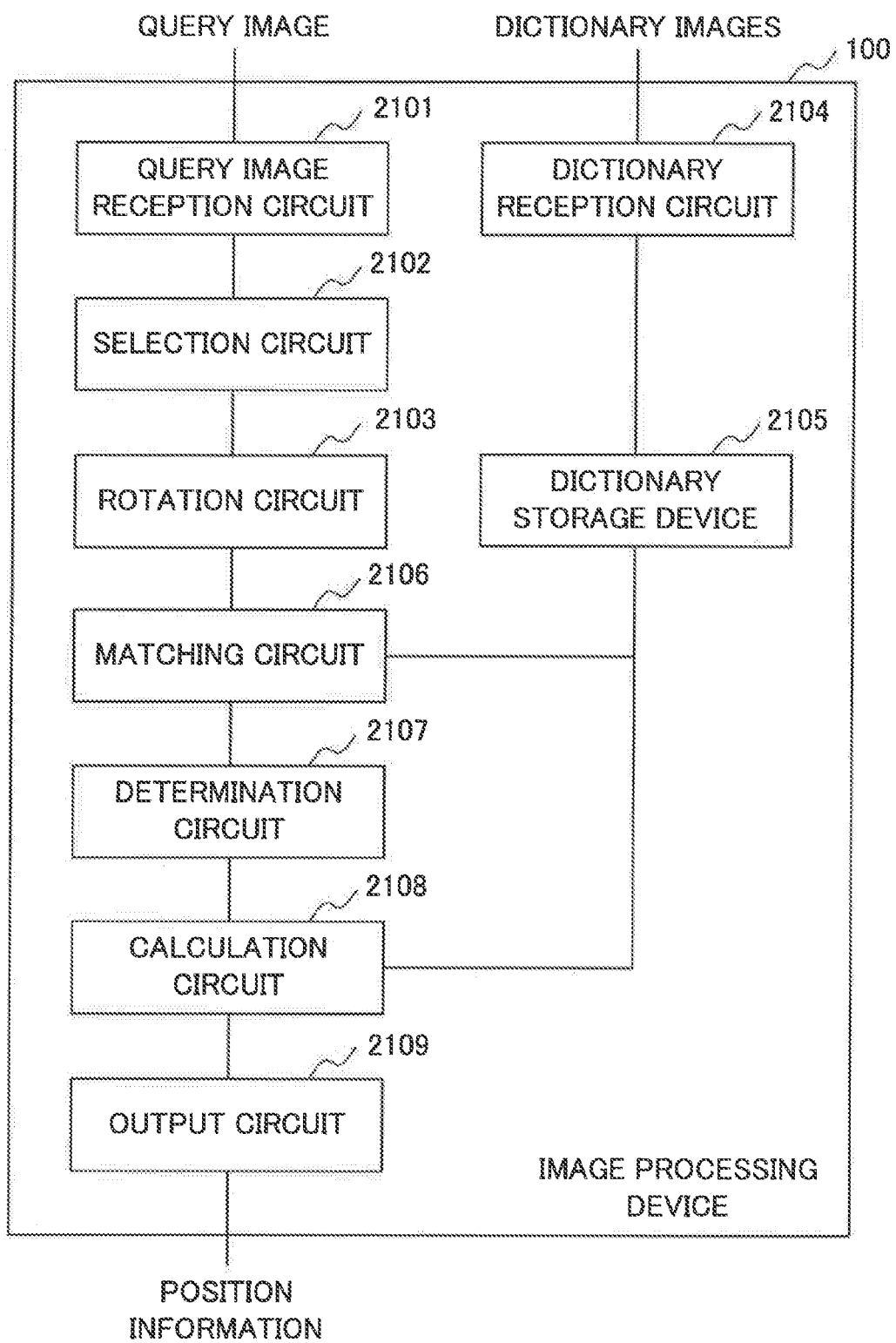
FIG. 21 is a block diagram of an example of a hardware structure of the image processing device according to the first exemplary embodiment of the present invention.

FIG. 21 is a block diagram of an example of a hardware structure of the image processing device according to the first exemplary embodiment of the present invention. According to FIG. 21, the image processing device 100 is implemented by including a query image reception circuit 2101, a selection circuit 2102, a rotation circuit 2103, a dictionary reception circuit 2104, a matching circuit 2106, a determination circuit 2107, a calculation circuit 2108 and an output circuit 2109.

The query image reception circuit 2101, the selection circuit 2102, the rotation circuit 2103, the dictionary reception circuit 2104, the dictionary storage device 2105, the matching circuit 2106, the determination circuit 2107, the calculation circuit 2108 and the output circuit 2109 may be implemented as a circuit or a plurality of circuits. The query image reception circuit 2101, the selection circuit 2102, the rotation circuit 2103, the dictionary reception circuit 2104, the dictionary storage device 2105, the matching circuit 2106, the determination circuit 2107, the calculation circuit 2108 and the output circuit 2109 may be implemented in one apparatus or a plurality of apparatuses.

The query image reception circuit 2101 operates as the query image reception unit 101. The selection circuit 2102 operates as the selection unit 102. The rotation circuit 2103 operates as the rotation unit 103. The dictionary reception circuit 2104 operates as the dictionary reception unit 104. The dictionary storage device 2105 operates as the dictionary storage unit 105. The matching circuit 2106 operates as the matching unit 106. The determination circuit 2107 operates as the determination unit 107. The calculation circuit 2108 operates as the calculation unit 108. The output circuit 2109 operates as the output unit 109.

Figure 22:
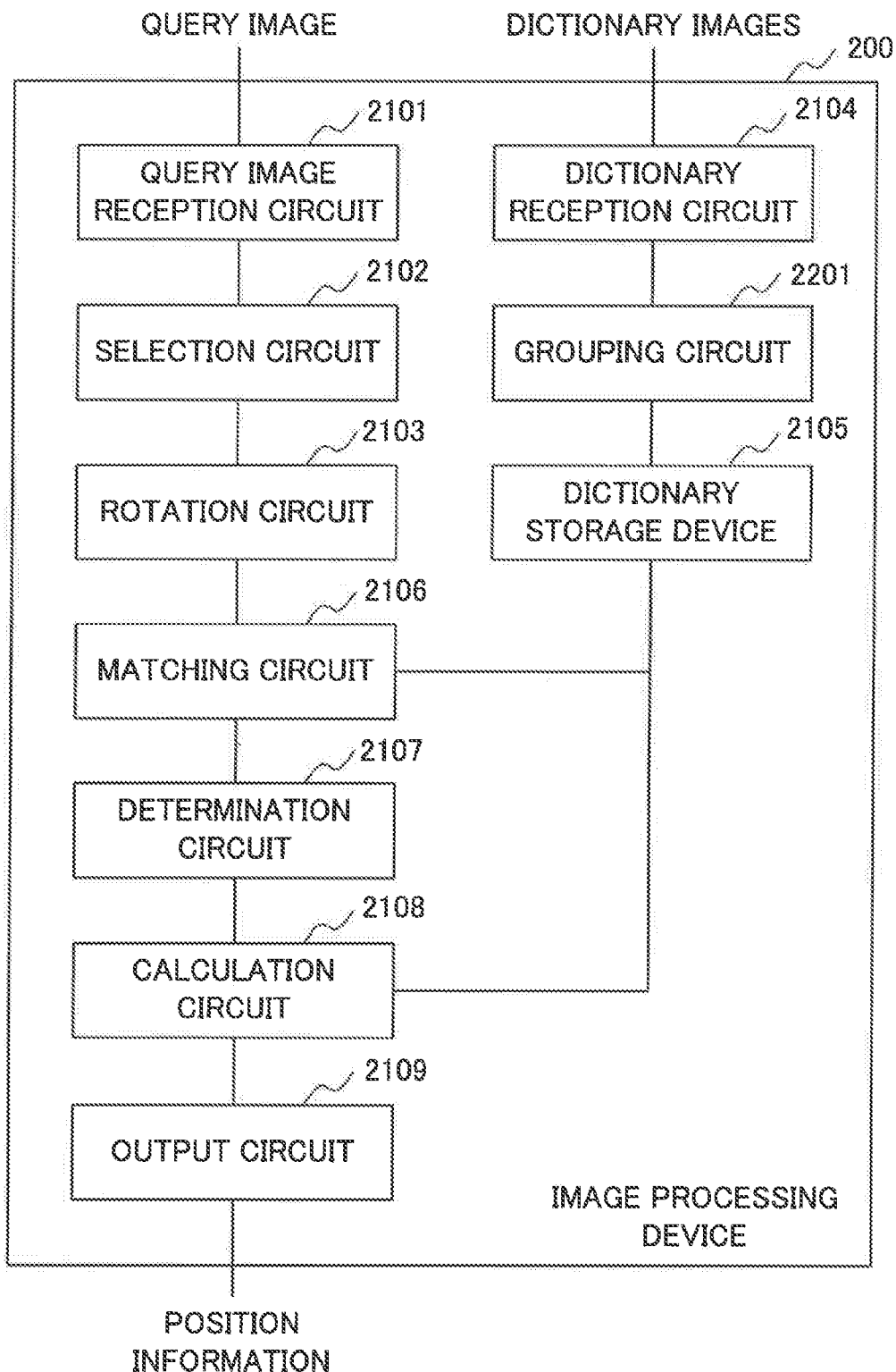
FIG. 22 is a block diagram of an example of a hardware structure of the image processing device according to the second exemplary embodiment of the present invention.

FIG. 22 is a block diagram of an example of a hardware structure of the image processing device according to the second exemplary embodiment of the present invention. According to FIG. 22, the image processing device 200 is implemented by including a query image reception circuit 2101, a selection circuit 2102, a rotation circuit 2103, a dictionary reception circuit 2104, a matching circuit 2106, a determination circuit 2107, a calculation circuit 2108, an output circuit 2109 and a grouping circuit 2201.

The query image reception circuit 2101, the selection circuit 2102, the rotation circuit 2103, the dictionary reception circuit 2104, the dictionary storage device 2105, the matching circuit 2106, the determination circuit 2107, the calculation circuit 2108, the output circuit 2109 and the grouping circuit 2201 may be implemented as a circuit or a plurality of circuits. The query image reception circuit 2101, the selection circuit 2102, the rotation circuit 2103, the dictionary reception circuit 2104, the dictionary storage device 2105, the matching circuit 2106, the determination circuit 2107, the calculation circuit 2108, the output circuit 2109 and the grouping circuit 2201 may be implemented in one apparatus or a plurality of apparatuses.

The query image reception circuit 2101 operates as the query image reception unit 101. The selection circuit 2102 operates as the selection unit 102. The rotation circuit 2103 operates as the rotation unit 103. The dictionary reception circuit 2104 operates as the dictionary reception unit 104. The dictionary storage device 2105 operates as the dictionary storage unit 105. The matching circuit 2106 operates as the matching unit 106. The determination circuit 2107 operates as the determination unit 107. The calculation circuit 2108 operates as the calculation unit 108. The output circuit 2109 operates as the output unit 109. The grouping circuit 2201 operates as the grouping unit 201.

Figure 23:
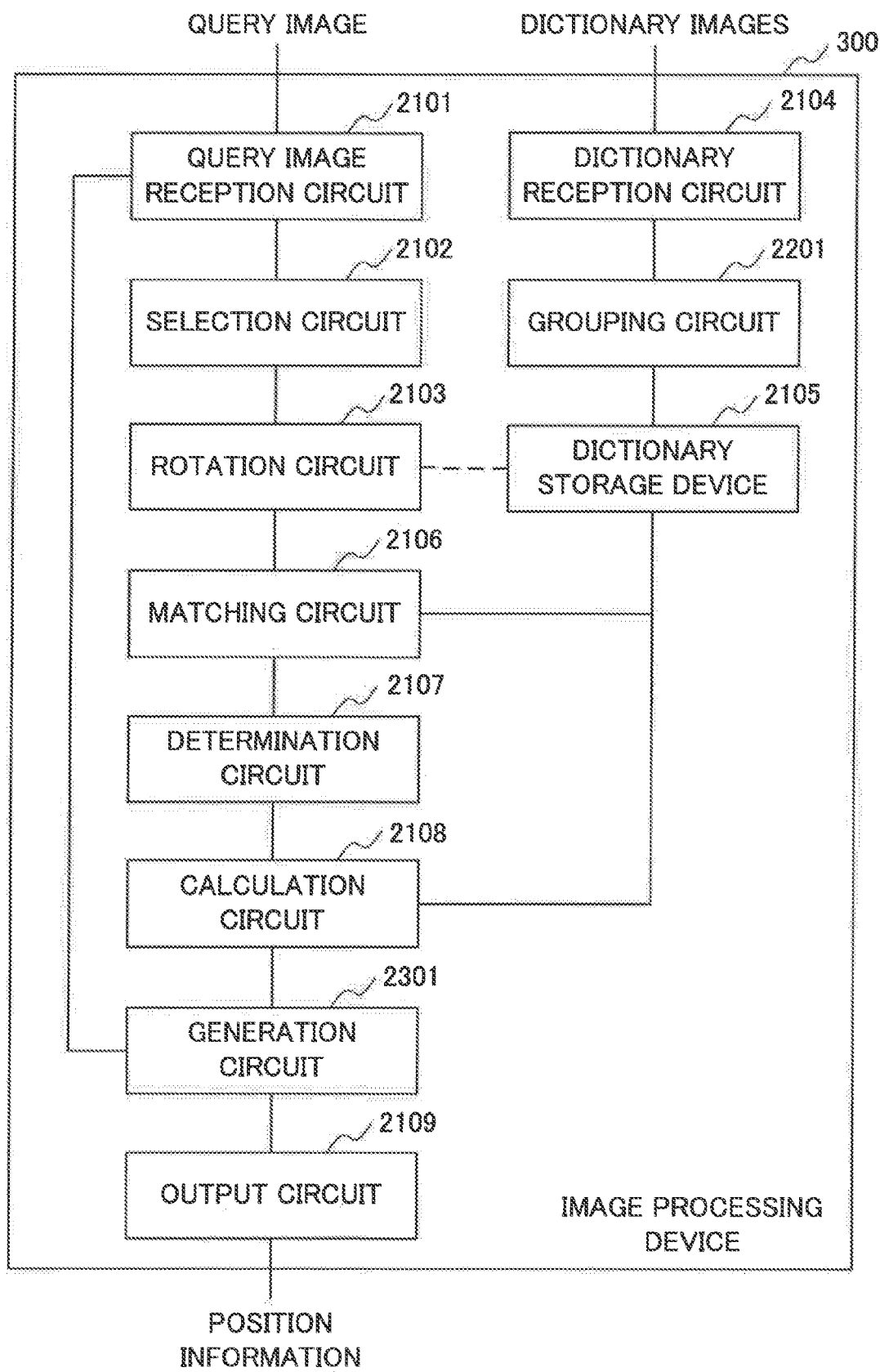
FIG. 23 is a block diagram of a first example of a hardware structure of the image processing device according to the third exemplary embodiment of the present invention.

FIG. 23 is a block diagram of a first example of a hardware structure of the image processing device according to the third exemplary embodiment of the present invention. According to FIG. 23, the image processing device 300 is implemented by including a query image reception circuit 2101, a selection circuit 2102, a rotation circuit 2103, a dictionary reception circuit 2104, a matching circuit 2106, a determination circuit 2107, a calculation circuit 2108, an output circuit 2109, a grouping circuit 2201 and a generation circuit 2301.

The query image reception circuit 2101, the selection circuit 2102, the rotation circuit 2103, the dictionary reception circuit 2104, the dictionary storage device 2105, the matching circuit 2106, the determination circuit 2107, the calculation circuit 2108, the output circuit 2109, the grouping circuit 2201 and the generation circuit 2301 may be implemented as a circuit or a plurality of circuits. The query image reception circuit 2101, the selection circuit 2102, the rotation circuit 2103, the dictionary reception circuit 2104, the dictionary storage device 2105, the matching circuit 2106, the determination circuit 2107, the calculation circuit 2108, the output circuit 2109, the grouping circuit 2201 and the generation circuit 2301 may be implemented in one apparatus or a plurality of apparatuses.

The query image reception circuit 2101 operates as the query image reception unit 101. The selection circuit 2102 operates as the selection unit 102. The rotation circuit 2103 operates as the rotation unit 103. The dictionary reception circuit 2104 operates as the dictionary reception unit 104. The dictionary storage device 2105 operates as the dictionary storage unit 105. The matching circuit 2106 operates as the matching unit 106. The determination circuit 2107 operates as the determination unit 107. The calculation circuit 2108 operates as the calculation unit 108. The output circuit 2109 operates as the output unit 109. The grouping circuit 2201 operates as the grouping unit 201. The generation circuit 2301 operates as the generation unit 301.

Figure 24:
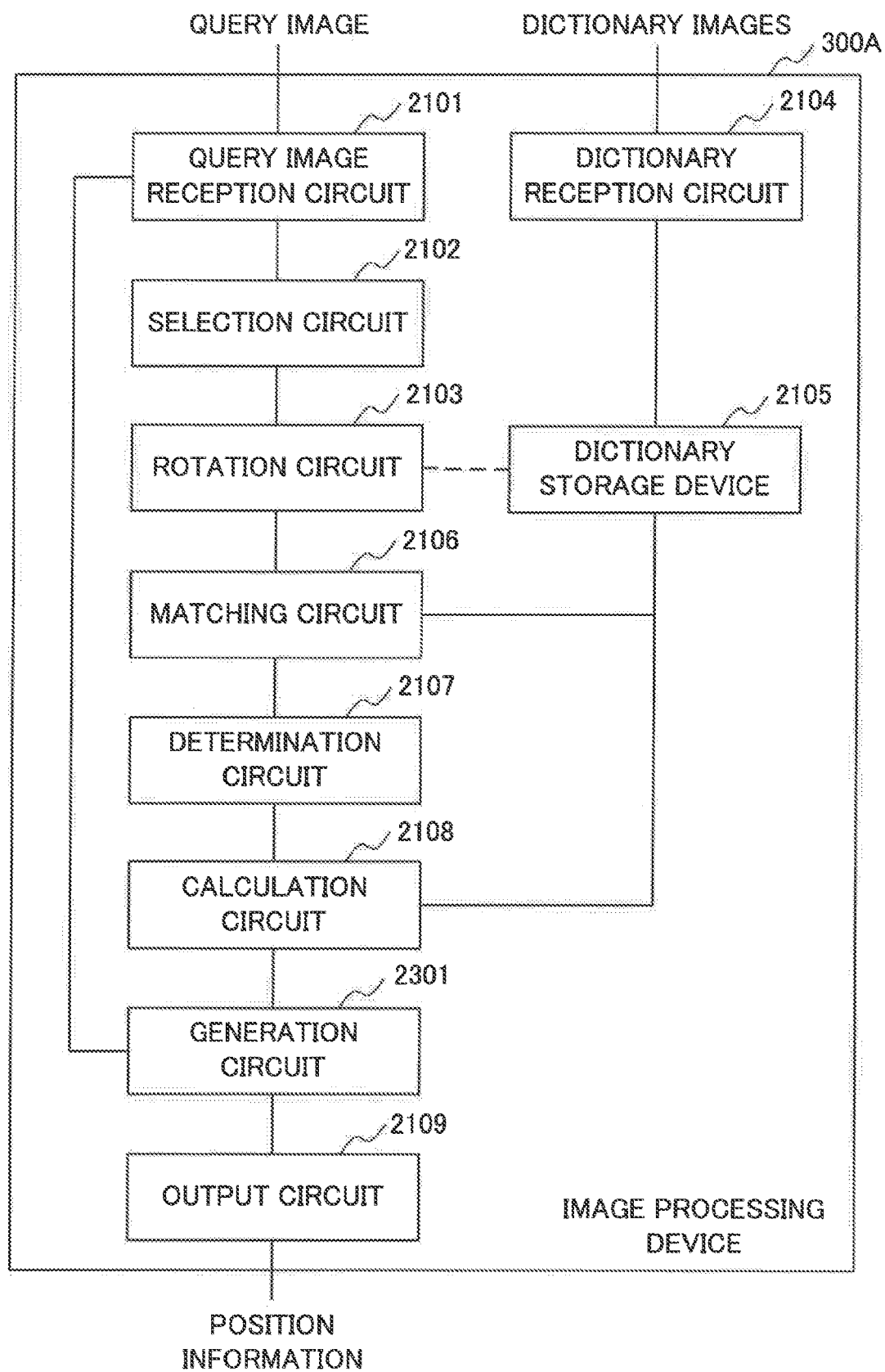
FIG. 24 is a block diagram of a second example of a hardware structure of the image processing device according to the third exemplary embodiment of the present invention.

FIG. 24 is a block diagram of a second example of a hardware structure of the image processing device according to the third exemplary embodiment of the present invention. According to FIG. 24, the image processing device 300A is implemented by including a query image reception circuit 2101, a selection circuit 2102, a rotation circuit 2103, a dictionary reception circuit 2104, a matching circuit 2106, a determination circuit 2107, a calculation circuit 2108, an output circuit 2109 and a generation circuit 2301.

The query image reception circuit 2101, the selection circuit 2102, the rotation circuit 2103, the dictionary reception circuit 2104, the dictionary storage device 2105, the matching circuit 2106, the determination circuit 2107, the calculation circuit 2108, the output circuit 2109 and the generation circuit 2301 may be implemented as a circuit or a plurality of circuits. The query image reception circuit 2101, the selection circuit 2102, the rotation circuit 2103, the dictionary reception circuit 2104, the dictionary storage device 2105, the matching circuit 2106, the determination circuit 2107, the calculation circuit 2108, the output circuit 2109 and the generation circuit 2301 may be implemented in one apparatus or a plurality of apparatuses.

The query image reception circuit 2101 operates as the query image reception unit 101. The selection circuit 2102 operates as the selection unit 102. The rotation circuit 2103 operates as the rotation unit 103. The dictionary reception circuit 2104 operates as the dictionary reception unit 104. The dictionary storage device 2105 operates as the dictionary storage unit 105. The matching circuit 2106 operates as the matching unit 106. The determination circuit 2107 operates as the determination unit 107. The calculation circuit 2108 operates as the calculation unit 108. The output circuit 2109 operates as the output unit 109. The generation circuit 2301 operates as the generation unit 301.

FIG. 25 is a block diagram of an example of a hardware structure of the image processing device according to the fourth exemplary embodiment of the present invention. According to FIG. 25, the image processing device 400 is implemented by including a matching circuit 2106 and a calculation circuit 2108.

The matching circuit 2106 and the calculation circuit 2108 may be implemented as a circuit or a plurality of circuits. The matching circuit 2106 and the calculation circuit 2108 may be implemented in one apparatus or a plurality of apparatuses.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be used for estimation of light emitting particle positions in images obtained by telescopes or microscopes. Resolution of images obtained by telescopes or microscopes is often limited by optics such as diffraction so that the separation of the light emitting particles is difficult without further processing. The present invention can also be used for generation of sharp images which show the particle positions from original low resolution images.

REFERENCE SIGNS LIST 100 image processing device
101 query image reception unit
102 selection unit
103 rotation unit
104 dictionary reception unit
105 dictionary storage unit
106 matching unit
107 determination unit
108 calculation unit
109 output unit
200 image processing device
201 grouping unit
300 image processing device
300A image processing device
301 generation unit
400 image processing device
1000 computer
1001 processor
1002 memory
1003 storage device
1004 I/O interface
1005 storage medium
2101 query image reception circuit
2102 selection circuit
2103 rotation circuit
2104 dictionary reception circuit
2105 dictionary storage device
2106 matching circuit
2107 determination circuit
2108 calculation circuit
2109 output circuit
2201 grouping circuit
2301 generation circuit

The invention claimed is:

1. An image processing device comprising
a memory that stores a set of instructions; and
at least one processor configured to execute the set of instructions to:
estimate similarity of input image to particle images including areas of particles at relative positons, true positions of the particles in the particle images being given;
categorize the particle images into groups based on distances between the true positions of the particles included in the particle images;
determine a group from the groups based on the similarity of the input image to the particle images grouped into the group; and
calculate positions of particles in the input image based on the similarity and the true particle positions of the particle images grouped into the determined group.

2. The image processing device according to claim 1, wherein
the at least one processor is further configured to:
generate an modified image by modifying intensities of pixels included in areas of the input image, the areas each including one of the calculated particle positions.

3. The image processing device according to claim 1, wherein
the at least one processor is further configured to:
estimate a line passing through positions of particles of the input image; and
rotate the input image so that a direction of the estimated line matches with a direction of a line passing through the true positions of particles in a particle image of the particle images; and
estimate similarity of the rotated input image to the particle images as the similarity.

4. The image processing device according to claim 1, wherein
the at least one processor is further configured to:
estimate candidate area of particles in the input image, and extract an extracted area including the estimated candidate area from the input image;
estimate, as the similarity, similarity of the extracted area of the input image to the particle images.

5. An image processing method comprising:
estimating similarity of input image to particle images including areas of particles at relative positons, true positions of the particles in the particle images being given;
categorizing the particle images into groups based on distances between the true positions of the particles included in the particle images;
determining a group from the groups based on the similarity of the input image to the particle images grouped into the group; and
calculating positions of particles in the input image based on the similarity and the true particle positions of the particle images grouped into the determined group.

6. The image processing method according to claim 5, further comprising:
generating an modified image by modifying intensities of pixels included in areas of the input image, the areas each including one of the calculated particle positions.

7. The image processing method according to claim 5, further comprising:
generating an modified image by modifying intensities of pixels included in areas of the input image, the areas each including one of the calculated particle positions.

8. The image processing method according to claim 5, further comprising:
estimating a line passing through positions of particles of the input image,
rotating the input image so that a direction of the estimated line matches with a direction of a line passing through the true positions of particles in a particle image of the particle images, and
estimating similarity of the rotated input image to the particle images as the similarity.

9. The image processing method according to claim 5, further comprising:

estimating candidate area of particles in the input image, and extract an extracted area including the estimated candidate area from the input image; and estimating, as the similarity, similarity of the extracted area of the input image to the particle images.

10. A non-transitory computer readable storage medium storing a program causing a computer to operate:

a matching process of estimating similarity of input image to particle images including areas of particles at relative positons, true positions of the particles in the particle images being given;

a grouping process of categorizing the particle images into groups based on distances between the true positions of the particles included in the particle images;

a determination process of determining a group from groups based on the similarity of the input image to the particle images grouped into the group; and a calculation process of calculating positions of particles in the input image based on the similarity and the particle true positions of the particle images grouped into the determined group.

11. The non-transitory computer readable storage medium according to claim 10, the program further causing a computer to operate:

a generation process of generating an modified image by modifying intensities of pixels included in areas of the input image, the areas each including one of the calculated particle positions.

12. The non-transitory computer readable storage medium according to claim 10, the program further causing a computer to operate:

a rotation process of estimating a line passing through positions of particles of the input image, and rotating the input image so that a direction of the estimated line matches with a direction of a line passing through the true positions of particles in a particle image of the particle images, wherein the matching process estimates, as the similarity, similarity of the rotated input image to the particle images.

13. The non-transitory computer readable storage medium according to claim 10, the program further causing a computer to operate:

a selecting process of estimating candidate area of particles in the input image, and extracting an extracted area including the estimated candidate area from the input image, wherein the matching process estimates, as the similarity, similarity of the extracted area of the input image to the particle images.

\* \* \* \* \*